(12) United States Patent
Kurihara et al.

(10) Patent No.: US 10,049,432 B2
(45) Date of Patent: Aug. 14, 2018

(54) IMAGE PROCESSING APPARATUS, IMAGE PROCESSING METHOD, PROGRAM AND RECORDING MEDIUM

(71) Applicant: MITSUBISHI ELECTRIC CORPORATION, Tokyo (JP)

(72) Inventors: Kohei Kurihara, Tokyo (JP); Yoshitaka Toyoda, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 33 days.

(21) Appl. No.: 15/324,858

(22) PCT Filed: Jun. 10, 2015

(86) PCT No.: PCT/JP2015/066699
§ 371 (c)(1),
(2) Date: Jan. 9, 2017

(87) PCT Pub. No.: WO2016/038958
PCT Pub. Date: Mar. 17, 2016

(65) Prior Publication Data
US 2017/0213319 A1 Jul. 27, 2017

(30) Foreign Application Priority Data

Sep. 10, 2014 (JP) .................................. 2014-183787

(51) Int. Cl.
*G06T 3/40* (2006.01)
*G06T 5/50* (2006.01)

(52) U.S. Cl.
CPC .......... *G06T 3/4038* (2013.01); *G06T 3/4007* (2013.01); *G06T 5/50* (2013.01)

(58) Field of Classification Search
None
See application file for complete search history.

(56) References Cited

U.S. PATENT DOCUMENTS

2007/0177167 A1  8/2007  Hatasawa et al.
2009/0172754 A1  7/2009  Furukawa
(Continued)

FOREIGN PATENT DOCUMENTS

JP   2007-206858 A   8/2007
JP   2008-67316 A    3/2008
(Continued)

*Primary Examiner* — Barry Drennan
*Assistant Examiner* — Schiller Hill
(74) *Attorney, Agent, or Firm* — Birch, Stewart, Kolasch & Birch, LLP

(57) ABSTRACT

An initial high-resolution image (D2) is generated by projection of low-resolution images (DIN) onto a high-resolution image space, an intermediate-resolution image (D31) is generated by projection of the low-resolution images (DIN) onto an intermediate-resolution image space, the intermediate-resolution image (D31) is interpolated and enlarged to generate an intermediate-resolution enlarged image (D3), and the pixel values of the undefined pixels in the initial high-resolution image (D2) are estimated using the pixel values of the corresponding pixels in the intermediate-resolution enlarged image (D3). It is possible to generate a high-resolution image of a high picture quality with higher accuracy even when less low-resolution images are used.

19 Claims, 22 Drawing Sheets

(56) References Cited

U.S. PATENT DOCUMENTS

| | | | |
|---|---|---|---|
| 2009/0185760 A1 | 7/2009 | Okada et al. | |
| 2010/0002949 A1* | 1/2010 | Tanaka | G06T 1/0007 382/254 |
| 2010/0239184 A1* | 9/2010 | Furukawa | G06T 3/4076 382/284 |
| 2012/0086850 A1* | 4/2012 | Irani | G06T 3/4053 348/441 |
| 2013/0084027 A1 | 4/2013 | Koga et al. | |
| 2013/0094781 A1 | 4/2013 | Koga et al. | |

FOREIGN PATENT DOCUMENTS

| | | |
|---|---|---|
| JP | 2008-109375 A | 5/2008 |
| JP | 2009-194896 A | 8/2009 |
| JP | 2010-218271 A | 9/2010 |
| JP | 2011-82614 A | 4/2011 |
| JP | 2011-165043 A | 8/2011 |
| JP | 2011-165045 A | 8/2011 |
| WO | WO 2011/099647 A1 | 8/2011 |
| WO | WO 2011/099648 A1 | 8/2011 |

* cited by examiner

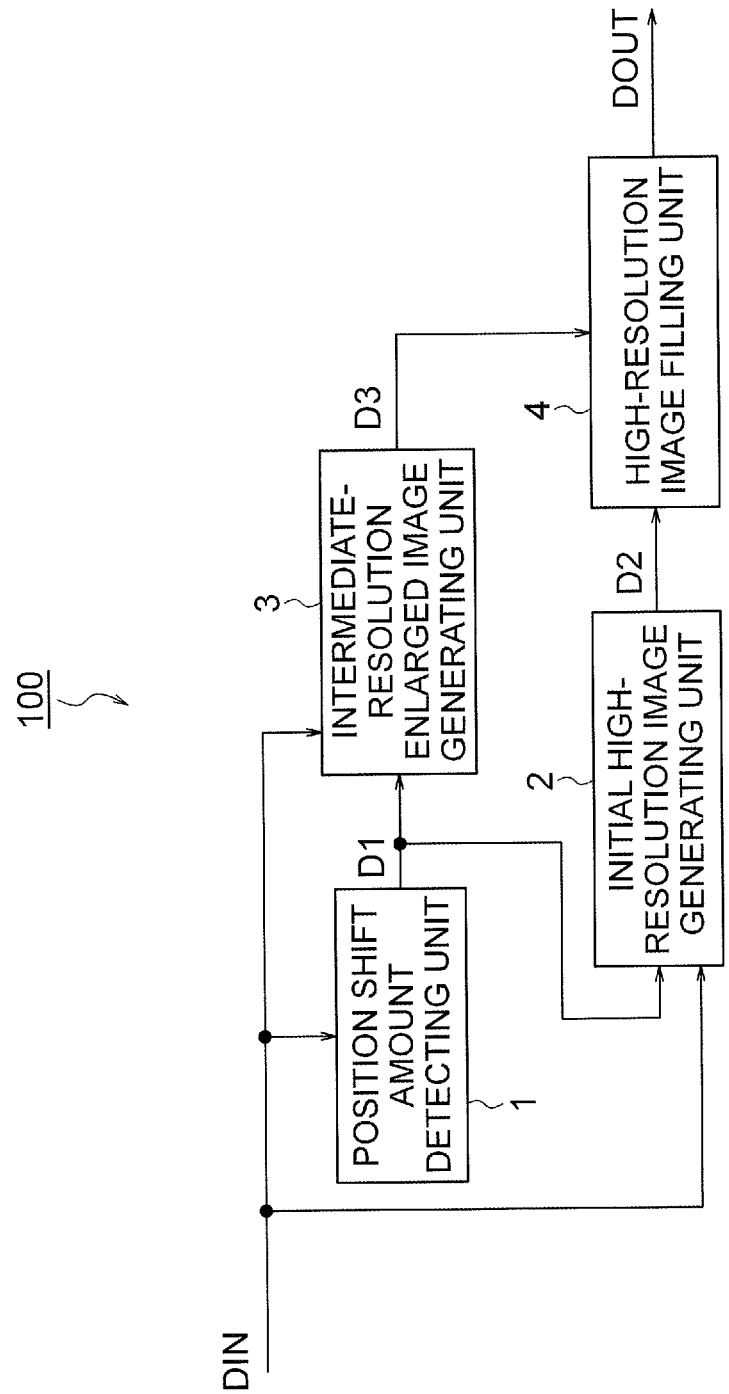

INITIAL HIGH-
RESOLUTION IMAGE

INTERMEDIATE-RESOLUTION
ENLARGED IMAGE

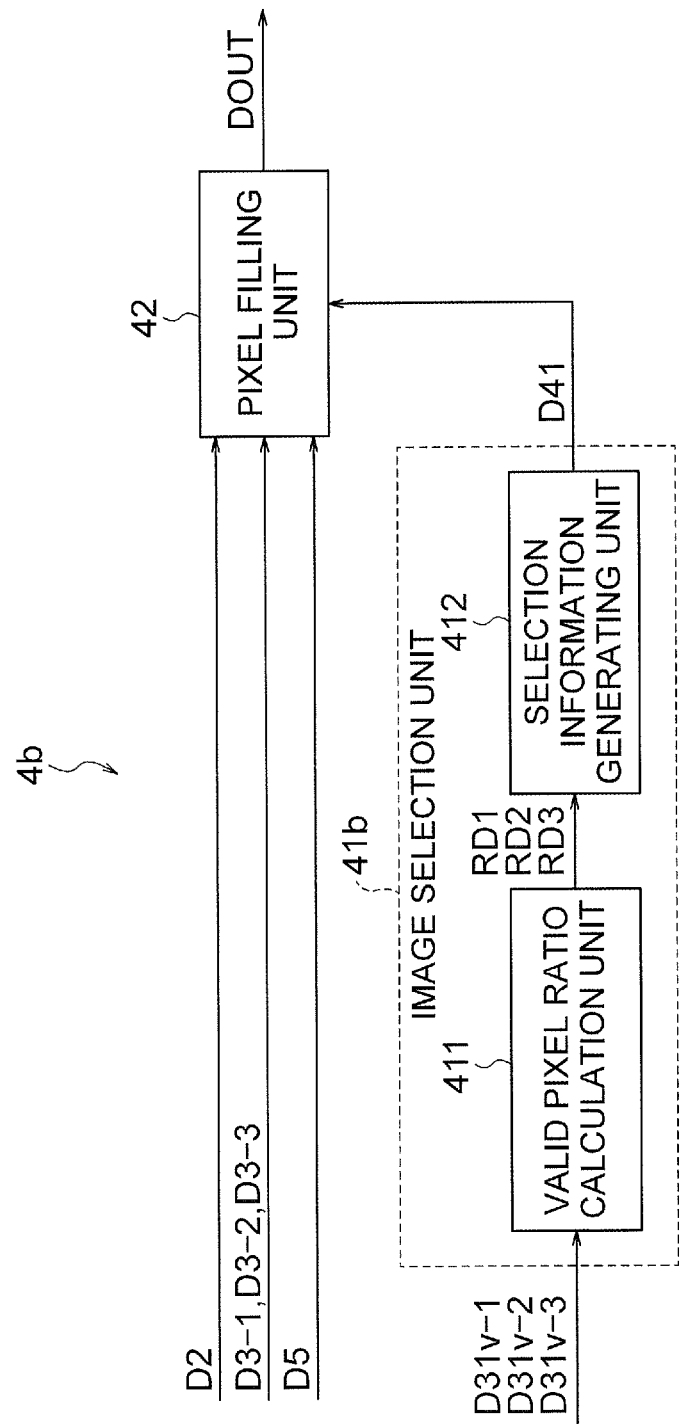

IMAGE PROCESSING APPARATUS, IMAGE PROCESSING METHOD, PROGRAM AND RECORDING MEDIUM

TECHNICAL FIELD

The present invention relates to an image processing apparatus and an image processing method for generating a high-resolution image from a plurality of low-resolution images. The present invention also relates to a program for causing a computer to implement the above mentioned image processing apparatus or method, and a recording medium in which the above-mentioned program is recorded.

BACKGROUND ART

Various techniques, called a super-resolution processing, for generating a high-resolution image from a plurality of low-resolution images have been developed. Representative super-processing methods which have been proposed include an ML (Maximum Likelihood) method, an MAP (maximum a posteriori) method, and a POCS (Projection Onto Convex Sets) method.

The above-mentioned methods are kinds of super-resolution reconstruction processing. In these kinds of processing, a high-resolution image is successively updated by iterative computation, based on a degradation model for relating a high-resolution image with a low-resolution image, to obtain a high-resolution image which reproduces the original image more faithfully. In the iterative computation, the high-resolution image is updated in such a manner that the differences between a pseudo low-resolution image (degraded image) obtained by degrading a high-resolution image by use of a degradation model, and a plurality of low-resolution images obtained by observation are minimized.

In the above-mentioned iterative computation, a high-resolution image which serves as an initial value (initial high-resolution image) needs to be generated in advance, and input. Depending on the closeness of the initial value to the original image, the number of times the computation needs to be iterated for obtaining a high-resolution image with a sufficient picture quality, or the picture quality that is ultimately obtained varies.

A generally known method for obtaining an initial high-resolution image is to enlarge, by interpolation, an arbitrary frame of a low-resolution image. Another method is to project (perform registration of) pixel values in a plurality of low-resolution images having shifts in the positions at which the pixel values are sampled (having position shifts), onto a corresponding high-resolution space according to the position shifts, so that they are associated with the pixels in the high-resolution image, thereby to obtain an initial high-resolution image with a high picture quality.

When an initial high-resolution image is generated using the above-mentioned method of registration, the high-resolution image may contain pixels (undefined pixels) with which no pixel in the low-resolution images is associated, and of which the pixel value is therefore not defined.

To solve this problem, patent reference 1 proposes to estimate the pixel values of the undefined pixels from the neighboring pixels, or to enlarge an input low-resolution image which serves as a reference and to fill the pixel values of the undefined pixels by referring to corresponding pixels in the enlarged image, or to obtain the pixel values of the undefined pixels by alpha-blending the pixels estimated in the above-mentioned methods.

PRIOR ART REFERENCES

Patent References

Patent reference 1: Japanese Patent Application Publication No. 2008-109375 (pages 7 to 9)

SUMMARY OF THE INVENTION

Problems to be Solved by the Invention

When there is a temporal or spatial restriction with regard to the number of times the images are captured, it is necessary to perform the super-resolution process with a small number of input images.

When the process disclosed in patent reference 1 is performed using a small number of input images, the initial high-resolution image contains many undefined pixels. In this case, in a region where there are many undefined pixels, the number of valid neighboring pixels which are available is insufficient, and the accuracy of the estimation is lowered. In the method of referring to the enlarged low-resolution image, high-frequency components are lost at the time of the enlargement, and when such pixels are used to fill the undefined pixels, the high-resolution image is degraded.

The present invention has been made to solve the problems mentioned above, and its object is to provide an image processing apparatus and an image processing method which can generate a high-resolution image with a high picture quality, with higher accuracy, even when a smaller number of low-resolution images are used.

Means for Solving the Problem

An image processing apparatus according one aspect of the present invention is for generating a high-resolution image from a plurality of low-resolution images in which positions of pixels are mutually shifted, the high-resolution image having a resolution of a predetermined target enlargement factor with respect to the low-resolution images, and comprises:

a position shift amount detecting unit for detecting a position shift amount pertaining to each of the pixels in the plurality of low-resolution images;

an initial high-resolution image generating unit for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;

an intermediate-resolution enlarged image generating unit for projecting, based on the position shift amounts, the pixels in the low-resolution images onto an image space having a resolution of an intermediate enlargement factor which is smaller than the target enlargement factor, associating the pixels in the low-resolution images with pixels in the image space, based on the projected positions, to generate an intermediate-resolution image including valid pixels which are pixels whose pixel values are defined, enlarging the intermediate-resolution image after estimating the pixel values of undefined pixels which are included in the intermediate-resolution image and which are pixels whose pixel values are not defined, based on the pixel values of the valid pixels proximate to the undefined pixels, thereby to generate an intermediate-resolution enlarged image of which a number of pixels is identical to that of the high-resolution image of the target enlarged factor and in which pixel values of all the pixels are defined; and a high-resolution image filling unit for estimating the pixel values of undefined pixels which are included in the initial high-resolution image and which are pixels whose pixel values are not defined, based on the pixel values of the pixels in the intermediate-resolution enlarged image, corresponding to the undefined pixels.

An image processing apparatus according another aspect of the present invention is for generating a high-resolution image from a plurality of low-resolution images in which positions of pixels are mutually shifted, the high-resolution image having a resolution of a predetermined target enlargement factor with respect to the low-resolution images, and comprises:

a position shift amount detecting unit for detecting a position shift amount pertaining to each of the pixels in the plurality of low-resolution images;

an initial high-resolution image generating unit for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;

an intermediate-resolution enlarged image generating unit for projecting, based on the position shift amounts, the pixels in the low-resolution images onto image spaces having resolutions of first to Ith (I being an integer not smaller than 2) intermediate enlargement factors which are mutually different and which are smaller than the target enlargement factor, associating the pixels in the low-resolution images with pixels in the image spaces, based on the projected positions, to generate first to Ith intermediate-resolution images including valid pixels which are pixels whose pixel values are defined, enlarging the first to Ith intermediate-resolution images after estimating the pixel values of undefined pixels which are included in the first to the Ith intermediate-resolution images and which are pixels whose pixel values are not defined, using the pixel values of the valid pixels proximate to the undefined pixels, to generate first to Ith intermediate-resolution enlarged images of which a number of pixels is identical to that of the high-resolution image of the target enlarged factor and in which pixel values of all the pixels are defined;

a low-resolution enlarged image generating unit for enlarging the low-resolution images to generate a low-resolution enlarged image; and a high-resolution image filling unit for estimating the pixel values of undefined pixels which are included in the initial high-resolution image and which are pixels whose pixel values are not defined, based on the pixel values of the pixels in the first to Ith intermediate-resolution enlarged images and the low-resolution enlarged image, corresponding to the undefined pixels.

An image processing apparatus according further aspect of the present invention is for generating a high-resolution image from a plurality of low-resolution images in which positions of pixels are mutually shifted, the high-resolution image having a resolution of a predetermined target enlargement factor with respect to the low-resolution images, and comprises:

a position shift amount detecting unit for detecting a position shift amount pertaining to each of the pixels in the plurality of low-resolution images;

an initial high-resolution image generating unit for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;

an intermediate-resolution enlarged image generating unit for projecting, based on the position shift amounts, the pixels in the low-resolution images, onto image spaces having resolutions of first to Ith (I being an integer not smaller than 2) intermediate enlargement factors which are smaller than the target enlargement factor and which are mutually different, associating, based on the projected positions, the pixels in the low-resolution images with the pixels in the image spaces to generate first to Ith intermediate-resolution images including valid pixels which are pixels whose pixel values are defined, enlarging the first to Ith intermediate-resolution images, after estimating the pixel values of undefined pixels which are pixels whose pixel values are not defined, using the pixel values of the valid pixels proximate to the undefined pixels, to generate first to Ith intermediate-resolution enlarged images of which a number of pixels is identical to that of the high-resolution image of the target enlargement factor, and in which pixel values of all the pixels are defined, and outputting, for each pixel in each of the first to Ith intermediate-resolution enlarged images, reliability information indicating whether said each pixel is a high-reliability pixel which is at a position corresponding to a valid pixel in a corresponding intermediate-resolution image, or a low-reliability pixel which is at a position corresponding to an undefined pixel in a corresponding intermediate-resolution image;

a low-resolution enlarged image generating unit for enlarging the low-resolution images to generate a low-resolution enlarged image;

an initial high-resolution image interpolation unit for performing interpolation, for each of undefined pixels which are included in the initial high-resolution image and which are pixels whose pixel values are not defined, referring to the valid pixels in a vicinity of the undefined pixels, if a ratio of the valid pixels among the pixels proximate to said each of the undefined pixels is not smaller than a predetermined valid pixel ratio threshold value, to output an initial high-resolution interpolated image;

intermediate-resolution enlarged image interpolation units for performing interpolation, for each of the low-reliability pixels in each of the first to Ith intermediate-resolution enlarged images, referring to the high-reliability pixels in a vicinity of said each of the low-reliability pixels, if a ratio of the high-reliability pixels among the pixels proximate to said each of the low-reliability pixels is not smaller than a predetermined high-reliability pixel ratio threshold value, to output first to Ith intermediate-resolution enlarged interpolated images; and an undefined pixel filling unit for successively selecting, as a pixel of interest, undefined pixels which are included in the initial high-resolution interpolated image and estimating the pixel value of the pixel of interest, based on pixel values of pixels in the first to Ith intermediate-resolution enlarged interpolated images and the low-resolution enlarged image, corresponding to the undefined pixel.

Effects of the Invention

According to the present invention, it is possible to generate a high-resolution image with a high picture quality, with higher accuracy, even when a smaller number of low-resolution images are used.

BRIEF DESCRIPTION OF THE DRAWINGS

FIG. 1 is a block diagram showing an image processing apparatus according to a first embodiment of the present invention.

FIG. 12 is a block diagram showing an exemplary configuration of a high-resolution image filling unit in the second embodiment.

MODE FOR CARRYING OUT THE INVENTION

First Embodiment

Figure 2A:
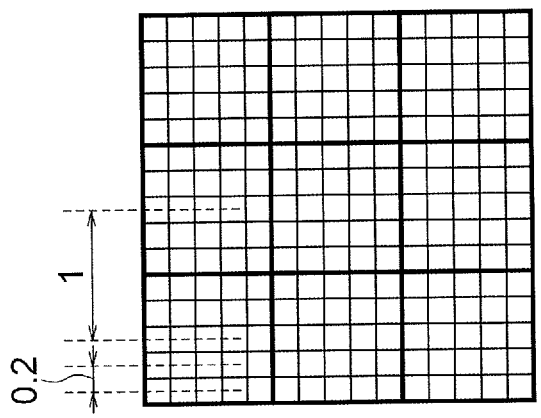
FIGS. 2(a) and 2(b) are diagrams showing arrangements of pixels in a low-resolution image and a high-resolution image.

FIG. 1 is a block diagram showing an image processing apparatus 100 according to a first embodiment of the present invention. The image processing apparatus according to the first embodiment is for outputting a high-resolution image DOUT having a resolution which is M times, both in the vertical direction and the horizontal direction, that of a plurality of low-resolution images DIN having position shifts, and includes a position shift amount detecting unit 1, an initial high-resolution image generating unit 2, an intermediate-resolution enlarged image generating unit 3, and a high-resolution image filling unit 4. M is called a target enlargement factor, or an ultimate enlargement factor. The target enlargement factor is designated prior to the start of the image processing. The following description is for a case where M=5.

Figure 2B:
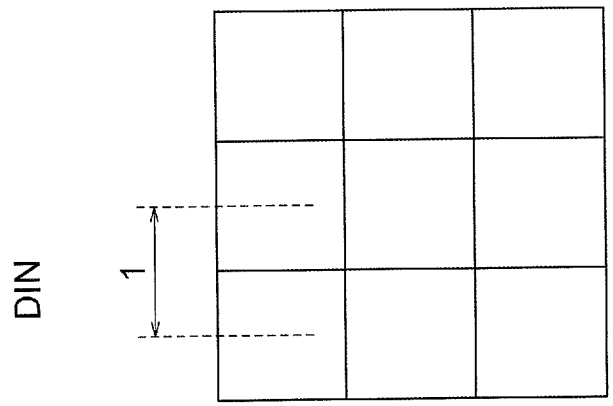

FIGS. 2(a) and 2(b) show arrangements of the pixels in a low-resolution image and a high-resolution image. In these diagrams, each square represents a pixel. For simplicity, a part consisting of 3×3 pixels in the low-resolution image, and a corresponding part consisting of 15×15 pixels in the high-resolution image are depicted in FIGS. 2(a) and 2(b).

Compared with the low-resolution image DIN in FIG. 2(a), the number of pixels in the high-resolution image DOUT in FIG. 2(b) is five times both in the vertical direction and the horizontal direction, and a group of 5×5 pixels are extracted at a position corresponding to each pixel in the low-resolution image DIN. The group of 5×5 pixels (each indicated by a surrounding bold line is called a cell. In the following description, the distances in the vertical direction and the horizontal direction in the low-resolution image DIN are represented, in a form normalized with respect to the pixel interval (that is, by taking a pixel interval as one), and the distances in the vertical direction and the horizontal direction in the high-resolution image DOUT are represented, in a form normalized with respect to the cell interval (that is, by taking a cell interval as one), for the sake of simplicity of description. Accordingly, in the high-resolution image, the pixel interval is 0.2 (=⅕), and the range of ±0.1 in the vertical direction and the horizontal direction from the center of each pixel is defined as a pixel range of the pixel.

The position shift amount detecting unit 1 detects, for each pixel in the plurality of low-resolution images DIN having position shifts, i.e., having pixels which are mutually position-shifted, a position shift amount, e.g., with respect to a reference image, and generates and outputs position shift amount information D1 indicating the detected position shift amount. In the following description, it is assumed that four low-resolution images are used as the plurality of low-resolution images DIN.

The initial high-resolution image generating unit 2 generates an initial high-resolution image D2, based on the plurality of low-resolution images DIN, and the position shift amount information D1 for each of the low-resolution images DIN. Like the high-resolution image DOUT, the initial high-resolution image D2 has a resolution M (=5) times that of the low-resolution images DIN both in the vertical direction and the horizontal direction, but includes, as will be described later, pixels (initial high-resolution image undefined pixels) whose pixel values are not defined.

The initial high-resolution image generating unit generates the initial high-resolution image D2, by casting or projecting each pixel in the plurality of low-resolution images DIN onto a high-resolution image space, at a position corresponding to the position shift of the pixel, and performing association based on the projected position. When there is no pixel (corresponding pixel) in any of the plurality of low-resolution images DIN which is projected onto a pixel in the initial high-resolution image D2, the pixel value is not defined for the above-mentioned pixel (in the initial high-resolution image D2). The pixel whose pixel value is not defined is called an "undefined pixel". The pixel whose pixel value is defined by the projection is called a "valid pixel".

The intermediate-resolution enlarged image generating unit 3 generates an intermediate-resolution enlarged image D3 based on the plurality of low-resolution images DIN, and the position shift amount information D1 for each of the low-resolution images DIN.

The intermediate-resolution enlarged image D3 has the number of pixels which is M (=5) times, in both the vertical direction and the horizontal direction, that of the low-resolution images DIN. The intermediate-resolution enlarged image D3 is obtained by first generating an image (intermediate-resolution image) having a resolution N(1<N<M) times, based on the plurality of low-resolution images DIN and the position shift amount information D1 for each of the low-resolution images DIN, then performing estimation of the undefined pixels (intermediate-resolution image undefined pixels) in the intermediate-resolution image from their neighboring valid pixels, and then performing enlargement by a factor of Sc(=M/N) by a filter computation process. In the intermediate-resolution enlarged image D3, all the pixels are defined. In the present embodiment, it is assumed that N=3.

The high-resolution image filling unit 4 estimates the pixel values of the undefined pixels included in the initial high-resolution image D2, based on the pixel values of the corresponding pixels in the intermediate-resolution enlarged image D3, and fills the undefined pixels with a pixel value by the estimation, and outputs the high-resolution image DOUT in which all the undefined pixels are filled with a pixel value.

The constituent elements in FIG. 1 will be described below in further detail.

First, a method of generating the position shift amount information D1 and the initial high-resolution image D2 is described by referring to FIGS. 3(a) to 3(d).

FIGS. 3(a) to 3(d) show a case in which an initial high-resolution image D2 is generated by using four low-resolution images. The four low-resolution images DIN are images F1 to F4 of frames 1 to 4, respectively.

Figure 3A:
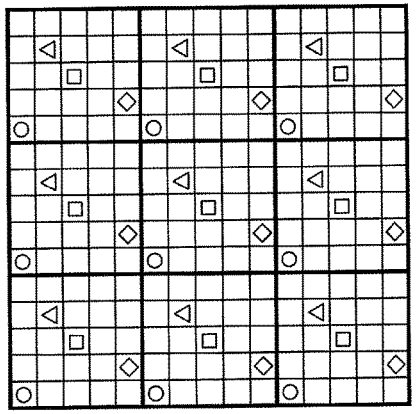
FIGS. 3(a) to 3(d) are diagrams showing processes of position shift amount detection and initial high-resolution image generation in the first embodiment.
Figure 3B:
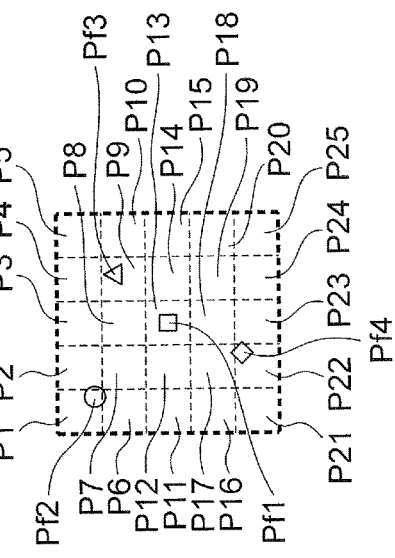
Figure 3C:
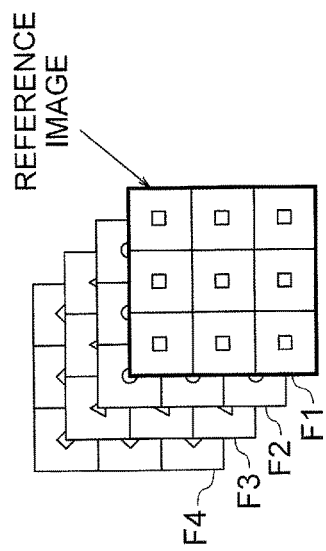
Figure 3D:
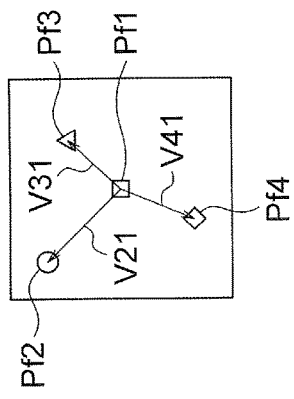

In FIGS. 3(a) and 3(b), a part consisting of 3×3 pixels in the low-resolution images DIN and a corresponding part consisting of 15×15 pixels in the initial high-resolution image D2 are depicted for simplicity, as in FIGS. 2(a) and 2(b). FIG. 3(c) shows a position shift pertaining to one pixel in each of the low-resolution images DIN, and FIG. 3(d) shows pixels in one cell in the initial high-resolution image D2, and the positions in the cell at which the pixels in the low-resolution images DIN are projected.

The position shift amount detecting unit 1 calculates, pixel by pixel, the position shift amount by which each pixel in the low-resolution images DIN having a position shift is shifted with respect to an image serving as a reference, and outputs the result of calculation as the position shift amount information D1. The detection of the position shift amount is performed by optical flow calculation, or calculation taking, as a reference, the position, attitude, and the like of the camera (used for capturing the low-resolution images DIN) in the three-dimensional space. The position shift amount needs to be detected with accuracy of a sub-pixel unit (accuracy of a unit shorter than the pixel interval in the low-resolution images).

FIG. 3(c) shows an example of position shifts pertaining to pixels in the low-resolution images corresponding to each other. In the illustrated example, one of the four images (image of frame 1) F1 is taken as a reference image, and with respect to a pixel Pf1 (indicated by □) in the reference image, pixels Pf2, Pf3, Pf4 (indicated by ○, △, ◇, respectively) in the three other images (images of frames 2, 3, 4) F2, F3, F4 are shifted toward the upper left, toward the upper right, and toward the bottom, respectively.

The position shift amounts are represented by vectors V21, V31, V41. The vectors V21, V31, V41 are represented by the positions of the pixels Pf2, Pf3, Pf4 relative to the pixel Pf1, for example by local coordinates (x21, y21), (x31, y31), (x41, y41) taking the position of the pixel Pf1 as the origin.

In the calculation of the position shift amounts V21, V31, V41, the position shift amount detecting unit searches the images other than the reference image for the pixel corresponding to each pixel (pixel of interest) in the reference image, and determines the relative positions, with respect to the pixel of interest, of the pixels having been found to correspond to the pixel of interest.

The position shift amount information D1 which has been obtained in this way and which indicates the position shift amounts V21, V31, V41 pertaining to the respective pixels is supplied from the position shift amount detecting unit 1 to the initial high-resolution image generating unit 2 and the intermediate-resolution enlarged image generating unit 3.

The initial high-resolution image generating unit 2 projects, based on the position shift amount information D1, pixels in the plurality of (four) low-resolution images DIN, onto the high-resolution image space, and associates (performs registration), based on the projected positions, the pixels in the low-resolution images DIN with pixels in the high-resolution image space, thereby to generate the initial high-resolution image D2 (FIG. 3(b)). In the high-resolution image space, the arranged position of each pixel and the pixel range of each pixel centered around the arranged position are defined.

Like the high-resolution image DOUT, the initial high-resolution image D2 has cells (indicated by surrounding bold lines) at positions corresponding to respective pixels in the low-resolution images DIN, and each cell consists of M×M (5×5) pixels P1 to P25.

FIG. 3(d) shows 5×5 pixels P1 to P25 in a cell, and projected positions in the cell, of pixels from the low-resolution images. In FIG. 3(d), the range of each pixel is indicated by a square drawn by dotted lines.

The pixel Pf1 (indicated by □) from the reference image F1 is projected at the center of the corresponding cell, and the pixel value of the pixel Pf1 is used for defining (determining) the pixel value of the pixel P13 at the center of the cell.

The pixels Pf2, Pf3, Pf4 (indicated by ○, ∆, ◇, respectively) from the images F2, F3, F4 other than the reference image are projected in the corresponding cell, at the positions corresponding to the respective position shift amounts V21, V31, V41, and are used to define (determine) the pixel values of the pixels having pixel ranges to which the projected positions of the pixels (positions of the centers of the projected pixels) belong.

Here, the "projection at the position corresponding to the position shift amount" means that, a pixel in a low-resolution image with a position shift amount (xd, yd) with respect to the center of the pixel (reference pixel) in the reference image is projected at a position (xd, yd) with respect to the center of the corresponding cell in the high-resolution image.

FIG. 3(d) shows a case in which the pixels Pf2, Pf3, Pf4 are projected in the pixel ranges of the pixels P1, P9, P22, respectively.

When a plurality of pixels among the pixels Pf1 to Pf4 are projected in the pixel range of the same pixel Pq (q is any one of 1 to 25), that is when they are placed in duplication in the same pixel range, the pixel values of such pixels are combined, and the result of the combination is used as the pixel value of the pixel Pq. The combination can be achieved, for example, by calculation of an average value. The average value may be a simple average value or a weighted average value. When a weighted average value is used, the weight may be made larger as the distance of the projected position from the center of the pixel Pq is shorter. Alternatively, the pixel value of the pixel whose projected position is the closest to the center of the pixel Pq may be selected and used as the pixel value of the pixel Pq. This is equivalent to calculating a weighted average by setting the weight to 1 for the pixel having the projected position closest to the center of the pixel Pq, and setting the weight to 0 for other pixels.

The pixels P1 to P25 include pixels having a pixel range in which none of the pixels Pf1 to Pf4 are projected. In the example shown in FIG. 3(d), none of the pixels are projected in the pixel ranges of the pixels P2 to P8, P10 to P12, P14 to P21, P23 to P25. As a result, the pixel values of these pixels are not defined (determined). As was mentioned above, the pixel whose pixel value is not defined is called an undefined pixel.

The image shown in FIG. 3(b) is obtained when the projection of the pixels and the definition of the pixel values in all the cells are made as shown in FIG. 3(d). That is, FIG. 3(b) shows a case in which the position shifts of the three low-resolution images F2, F3, F4 with respect to the reference image F1 are identical among the nine pixels that are illustrated, and therefore the projected positions in the high-resolution image space, from the pixels in the low-resolution images are identical among the nine cells.

In the manner described above, an initial high-resolution image D2 in which at least part of the pixels are valid pixels, in other words, which includes valid pixels which are pixels whose pixel values are defined, is generated. The generated initial high-resolution image D2 is supplied to the high-resolution image filling unit 4.

From the position shift amount information D1 and the low-resolution images DIN, the intermediate-resolution enlarged image generating unit 3 generates an image, as the intermediate-resolution enlarged image D3, having a resolution corresponding to an enlargement factor (intermediate enlargement factor) N which is smaller than the target enlargement factor, and having the number of pixels identical to that of the high-resolution image DOUT, and outputs the intermediate-resolution enlarged image D3.

Figure 4:
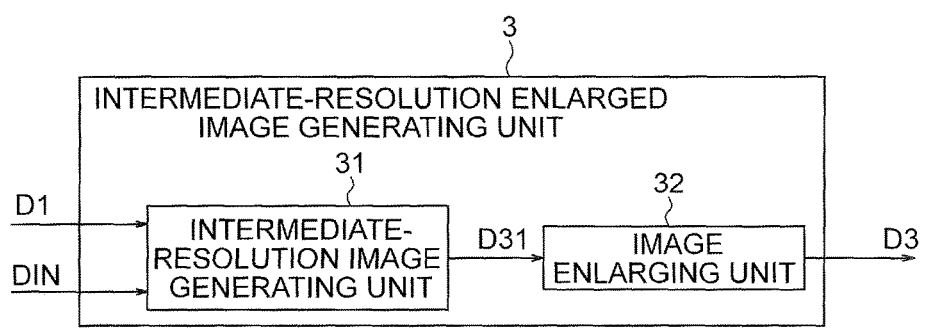
FIG. 4 is a block diagram showing an exemplary configuration of an intermediate-resolution enlarged image generating unit in the first embodiment.

FIG. 4 is a block diagram showing an exemplary configuration of the intermediate-resolution enlarged image generating unit 3. The illustrated intermediate-resolution enlarged image generating unit 3 includes an intermediate-resolution image generating unit 31, and an image enlarging unit 32.

Figure 5A:
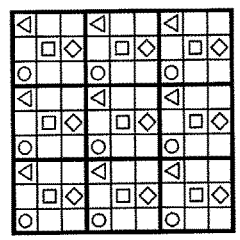
FIGS. 5(a) to 5(d) are diagrams showing processes of position shift amount detection and intermediate-resolution image generation in the first embodiment.

The operation of the intermediate-resolution image generating unit 31 is explained below with reference to FIGS. 5(a) to 5(d). FIGS. 5(a) and 5(c) are identical to FIGS. 3(a) and 3(c), and show the operation of the position shift amount detecting unit 1.

Figure 5B:
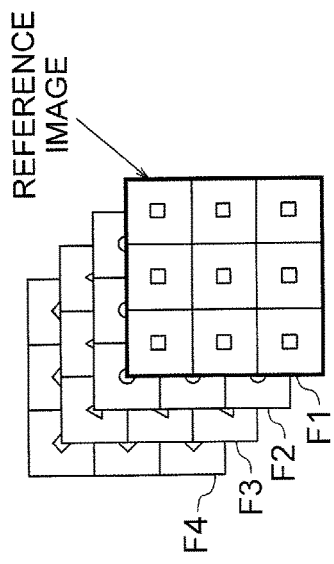
Figure 5C:
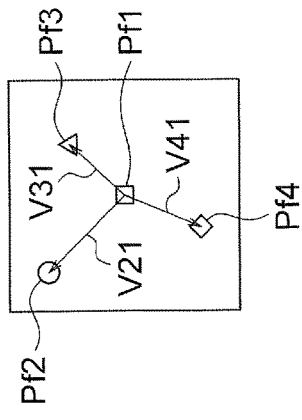

The intermediate-resolution image generating unit 31 projects, based on the position shift amount information D1, pixels in the plurality of (four) low-resolution images DIN, onto the intermediate-resolution image space, at the pixel positions (i.e., at positions corresponding to the pixel positions in the low-resolution images DIN), and associates (performs registration), based on the projected positions, the pixels in the low-resolution images DIN with pixels in the intermediate-resolution image space, thereby to generate an intermediate-resolution image D31 (FIG. 5(b)). In the intermediate-resolution image space, the arranged position of each pixel and the pixel range of each pixel centered around the arranged position are defined.

The intermediate-resolution image D31 has cells (indicated by surrounding bold lines) corresponding to respective pixels in the low-resolution images DIN and each consisting of N×N (3×3) pixels P1 to P9.

Figure 5D:
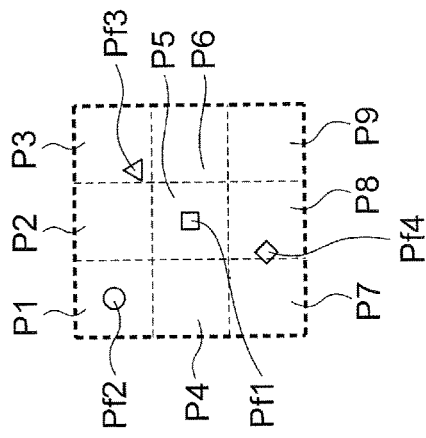

FIG. 5(d) shows 3×3 pixels P1 to P9 in a cell, and projected positions in the cell, of pixels from the low-resolution images. In FIG. 5(d), the range of each pixel is shown by a square drawn by dotted lines.

The pixel Pf1 (indicated by □) from the reference image F1 is projected at the center of the corresponding cell, and the pixel value of the pixel Pf1 is used for defining (determining) the pixel value of the pixel P5 at the center of the cell.

The pixels Pf2, Pf3, Pf4 (indicated by ○, ∆, ◇, respectively) from the images F2, F3, F4 other than the reference image are projected in the corresponding cell, at the positions corresponding to the respective position shift amounts V21, V31, V41, and are used to define (determine) the pixel values of the pixels having pixel ranges to which the projected positions of the pixels (positions of the centers of the projected pixels) belong.

Here, the "projection at the position corresponding to the position shift amounts" means that, a pixel in a low-resolution image with a position shift amount (xd, yd) with respect to the center of the pixel (reference pixel) in the reference image is projected at a position (xd, yd) with respect to the center of the corresponding cell in the intermediate-resolution image.

FIG. 5(d) shows a case in which the pixels Pf2, Pf3, Pf4 are projected in the pixel ranges of the pixels P1, P3, P8, respectively.

When a plurality of pixels among the pixels Pf1 to Pf4 are projected in the pixel range of the same pixel Pq (q is any one of 1 to 9), that is when they are placed in duplication in the same pixel range, an average value of the pixel values of such pixels is used as the pixel value of the pixel Pq. The average value may be a simple average value or a weighted average value. When a weighted average value is used, the weight may be made larger as the distance of the projected position from the center of the pixel Pq is shorter. Alternatively, the pixel value of the pixel whose projected position is the closest to the center of the pixel Pq may be used as the pixel value of the pixel Pq. This is equivalent to calculating a weighted average by setting the weight to 1 for the pixel having the projected position closest to the center of the pixel Pq, and setting the weight to 0 for other pixels.

The pixels P1 to P9 include pixels having a pixel range in which none of the pixels Pf1 to Pf4 are projected. In the example shown in FIG. 5(d), none of the pixels are projected in the pixel ranges of the pixels P2, P4, P6, P7, P9, and they are therefore undefined pixels.

The image shown in FIG. 5(b) is obtained when the projection of the pixels and the definition of the pixel values in all the cells are made as shown in FIG. 5(d). That is, FIG. 5(b) shows a case in which the position shifts of the three low-resolution images F2, F3, F4 with respect to the reference image F1 are identical among the nine pixels that are illustrated, and therefore the projected positions in the intermediate-resolution image space, from the pixels in the low-resolution images are identical among the nine cells.

In the manner described above, an intermediate-resolution image D31 in which at least part of the pixels are valid pixels, in other words, which includes valid pixels which are pixels whose pixel values are defined, is generated. The generated intermediate-resolution image D31 is supplied to the image enlarging unit 32.

The image enlarging unit 32 fills the undefined pixels in the intermediate-resolution image D31 with an estimated value to generate a filled intermediate-resolution image, and enlarges the filled intermediate-resolution image to a size (number of pixels) identical to that of the high-resolution image, and outputs the resultant image as the intermediate-resolution enlarged image D3. As the estimated value of each undefined pixel, an average value of the pixel values of valid pixels neighboring the undefined pixel, or the pixel value of the pixel closest to the undefined pixel may be used. In the latter case, where there are a plurality of valid pixels which are the closest, an average value of the pixel values of the plurality of valid pixels, or the pixel value of the pixel selected among the plurality of valid pixels according a predefined rule may be used.

In the enlargement of the filled intermediate-resolution image, the filled intermediate-resolution image is enlarged and interpolated to have the number of pixels identical to that of the high-resolution image DOUT, by a filter computation process, such as a bilinear method or a bicubic method, to generate the intermediate-resolution enlarged image D3 in which the pixel values of all the pixels are defined. When the target enlargement factor is M, and the intermediate enlargement factor is N, the factor (enlargement factor) Sc of the enlargement performed at the image enlarging unit 32 is given by the equation (1).

$$Sc=M/N \quad (1)$$

By the filling of the undefined pixels and the enlargement at the image enlarging unit 32, the intermediate-resolution enlarged image D3 in which the pixel values of all the pixels are defined is generated. The generated intermediate-resolution enlarged image D3 is supplied to the high-resolution image filling unit 4.

Figures 6A, 6B:
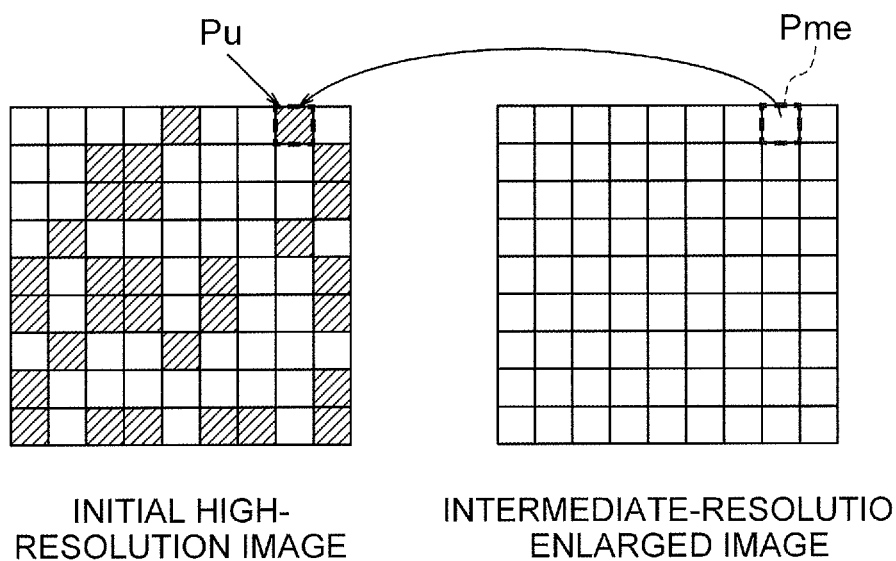
FIGS. 6(a) and 6(b) are diagrams showing a process of high-resolution image filling in the first embodiment.

The high-resolution image filling unit 4 refers to the intermediate-resolution enlarged image D3 output from the intermediate-resolution enlarged image generating unit 3, to estimate the pixel values of the undefined pixels (indicated by hatching in FIG. 6(a)) in the initial high-resolution image D2 output from the initial high-resolution image generating unit 2. For example, the high-resolution image filling unit 4 fills each of the undefined pixels, Pu in the initial high-resolution image D2 shown in FIG. 6(a), with the pixel value of the pixel Pme (FIG. 6(b)) in the intermediate-resolution enlarged image D3 corresponding to (at the same position in the image as) the undefined pixel. An image obtained by filling all the undefined pixels in the initial high-resolution image D2 with a pixel value in the above described manner is output as the high-resolution image DOUT.

By the above described process, among the pixels in the initial high-resolution image D2, the pixels (valid pixels) whose pixel values are defined by the projection from the low-resolution images are used, without modification, as the pixels in the high-resolution image DOUT, the pixels whose pixel values are not defined by the projection from the low-resolution images are filled with a pixel value of the corresponding pixel in the intermediate-resolution enlarged image D3, and are used as the pixels in the high-resolution image DOUT. Accordingly, the high-resolution image DOUT is an image in which the pixel values of all the pixels are defined.

This completes the description of the operation of the image processing apparatus according to the first embodiment.

Next, the effects obtained by the image processing apparatus of the first embodiment is explained.

In the image processing apparatus 100 of the first embodiment, the initial high-resolution image D2 of a target enlargement factor M is generated, and in addition, the intermediate-resolution enlarged image D3 is generated, and the undefined pixels in the initial high-resolution image D2 are filled with the pixel values of the corresponding pixels in the intermediate-resolution enlarged image D3, thereby to generate the high-resolution image DOUT in which the pixel value is defined for all the pixels. In this way, it is possible to generate the high-resolution image with higher accuracy, even when the number of low-resolution images used is smaller.

In the method of the present embodiment, the intermediate-resolution enlargement image D3 contains more high-frequency components than the input low-resolution images DIN, because the enlargement factor for the interpolation enlargement at the time of generating the intermediate-resolution enlarged image D3 is smaller, so that the estimation of the undefined pixels can be made with higher accuracy, than by the conventional method in which the low-resolution image is enlarged, and the corresponding pixel values are referred to.

The method of the present embodiment has a further advantage that even when the number of low-resolution images is small, or the target enlargement factor is large, so that there are less valid pixels (pixels whose pixel values are defined by the projection from the low-resolution images) in the initial high-resolution image, the undefined pixels are filled with a pixel value and the high-resolution image in which high-frequency components are reproduced can be generated more stably, than by the conventional method in which the undefined pixels are estimated from their proximate pixels.

Second Embodiment

Figure 7:
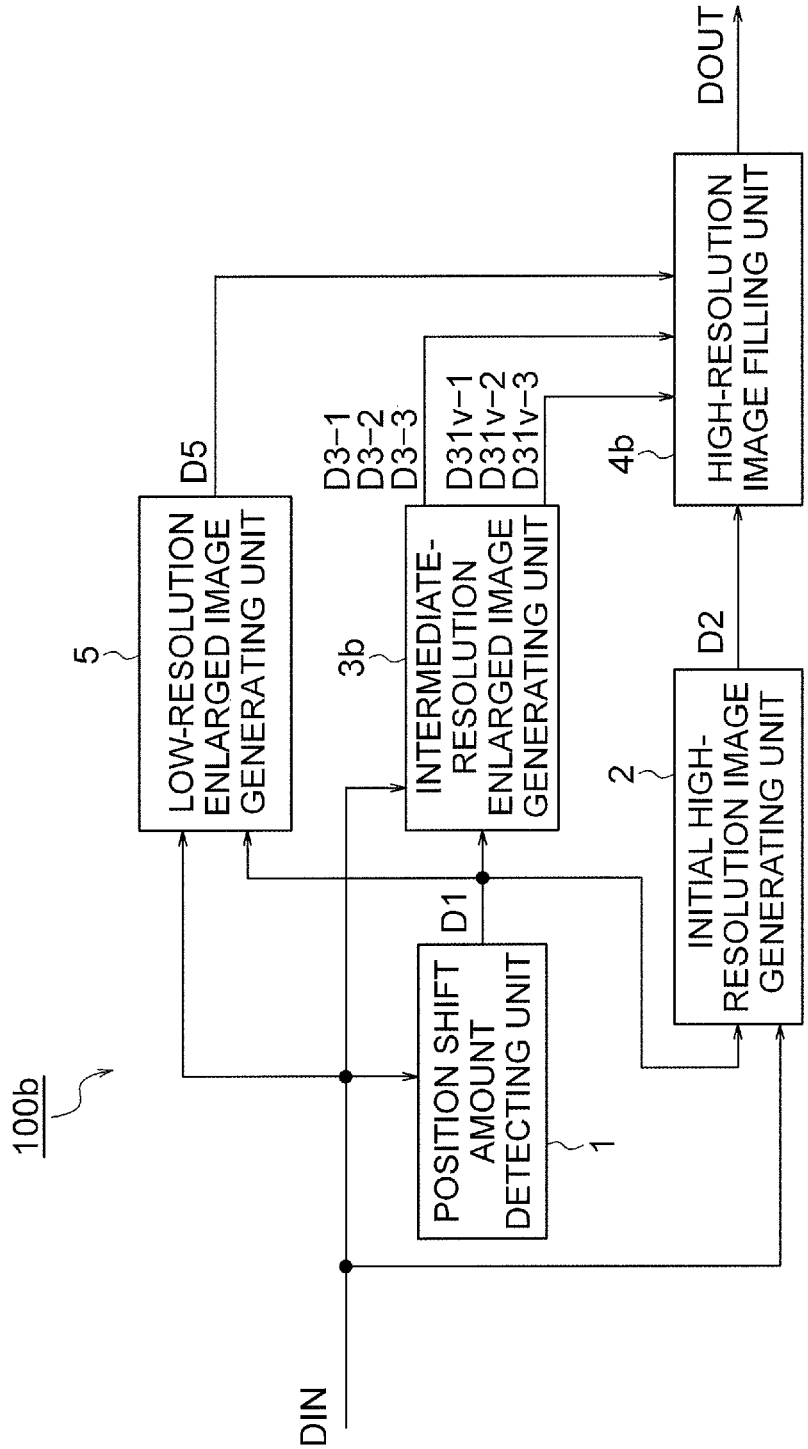
FIG. 7 is a block diagram showing an image processing apparatus according to a second embodiment of the present invention.

FIG. 7 is a block diagram showing an image processing apparatus 100b according to a second embodiment of the present invention.

The illustrated image processing apparatus 100b is generally identical to the image processing apparatus 100 shown in FIG. 1. But an intermediate-resolution enlarged image generating unit 3b and a high-resolution image filling unit 4b are used in place of the intermediate-resolution enlarged image generating unit 3 and the high-resolution image filling unit 4, and a low-resolution enlarged image generating unit 5 is added.

Figure 8:
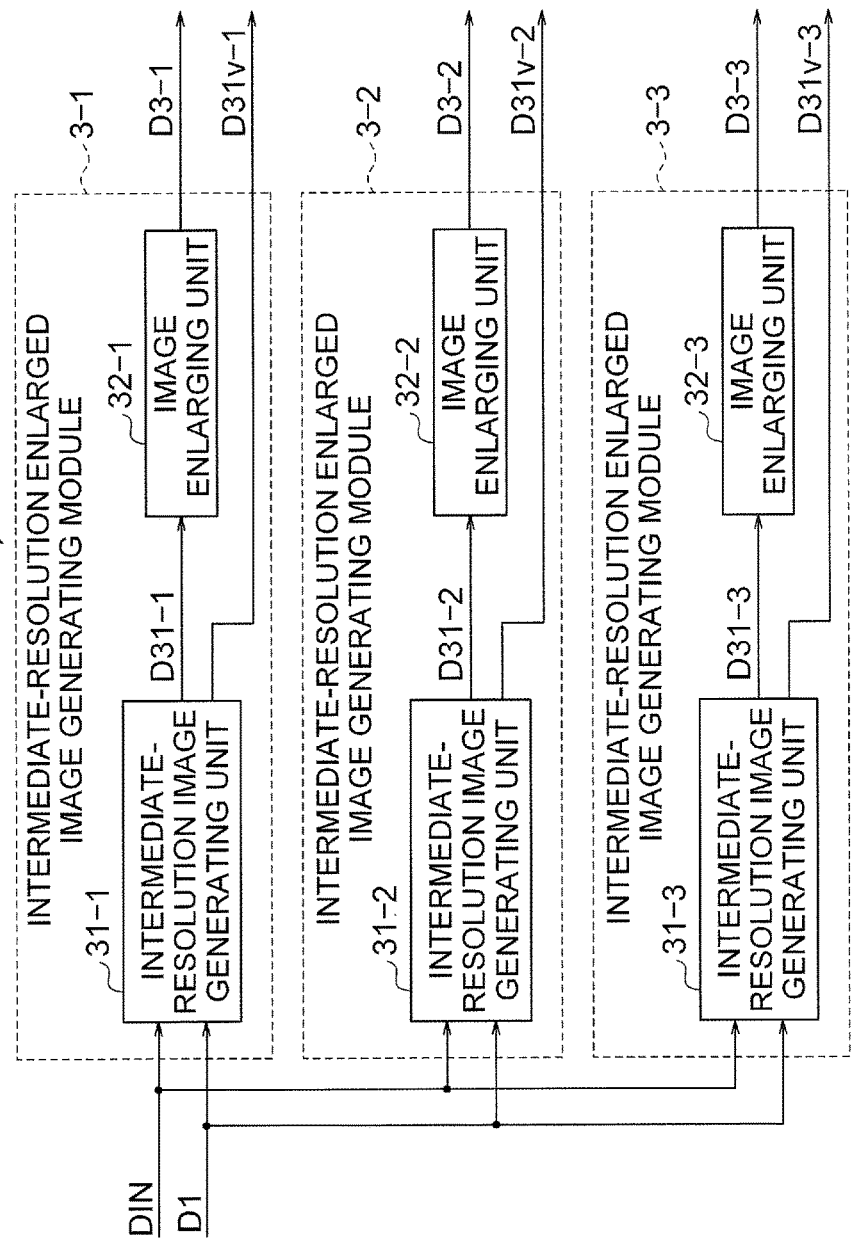
FIG. 8 is a block diagram showing an exemplary configuration of an intermediate-resolution enlarged image generating unit in the second embodiment.

As shown in FIG. 8, the intermediate-resolution enlarged image generating unit 3b includes a plurality of, e.g., first to third intermediate-resolution enlarged image generating modules 3-1, 3-2, 3-3.

The first to third intermediate-resolution enlarged image generating modules 3-1, 3-2, 3-3 each have a configuration identical to that of the intermediate-resolution enlarged image generating unit shown in FIG. 4. But the intermediate enlargement factors are different from each other. The intermediate enlargement factors N1, N2, N3 of the first to third intermediate-resolution enlarged image generating modules 3-1, 3-2, 3-3 are for example 2, 3, 4.

That is, the first intermediate-resolution enlarged image generating module 3-1 includes a first intermediate-resolution image generating unit 31-1 and a first image enlarging unit 32-1. The second intermediate-resolution enlarged image generating module 3-2 includes a second intermediate-resolution image generating unit 31-2 and a second image enlarging unit 32-2. The third intermediate-resolution enlarged image generating module 3-3 includes a third intermediate-resolution image generating unit 31-3 and a third image enlarging unit 32-3.

Each of the first to third intermediate-resolution image generating units 31-1 to 31-3 is identical to the intermediate-resolution image generating unit 31 shown in FIG. 4, but their intermediate enlargement factors are N1, N2, N3, respectively.

The intermediate-resolution image generating units 31-1, 31-2, 31-3 project pixels in the plurality of low-resolution images DIN onto the intermediate-resolution image spaces with the intermediate enlargement factors N1, N2, N3, respectively, at the pixel positions, and associate (perform registration), based on the projected positions, the pixels in the low-resolution images DIN with pixels in the intermediate-resolution image spaces, thereby to generate the intermediate-resolution images D31-1, D31-2, D31-3.

Figure 9:
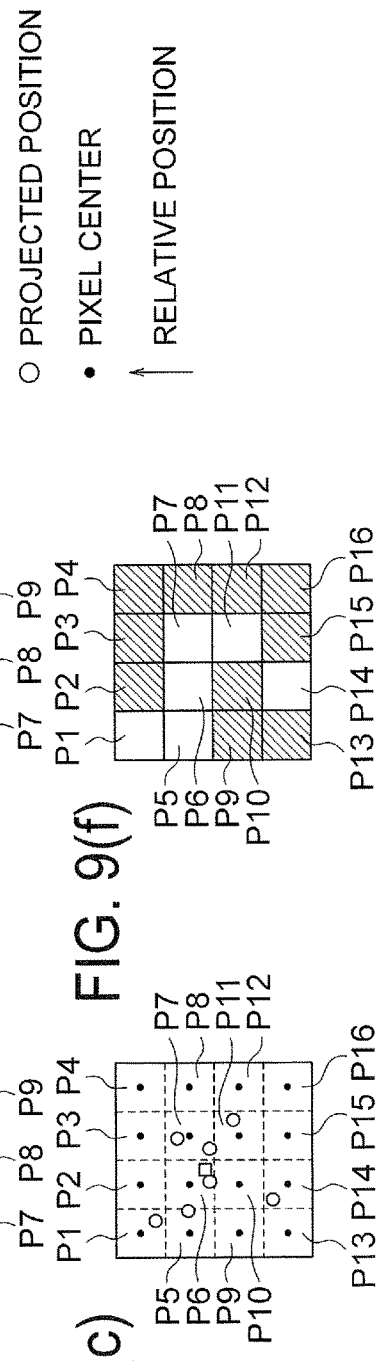
FIGS. 9(a) to 9(f) are diagrams showing generation of intermediate-resolution images by means of projection from low-resolution images.
FIG. 9(g) shows shifts in the projected positions, from the pixel centers.

FIGS. 9(a) to 9(c) show the projected positions in cells in the intermediate-resolution images, when the pixels corresponding to each other (pixels having position shifts with respect to each other) in a plurality of low-resolution images DIN are projected onto the intermediate-resolution image spaces with the intermediate enlargement factors N1, N2, N3, respectively. FIGS. 9(d) to 9(f) show valid pixels and undefined pixels in the cells in the intermediate-resolution images, in a manner in which the valid pixels and the undefined pixels are distinguished from each other.

As shown in FIG. 9(a), cells in the first intermediate-resolution image D31-1 each have 2×2 pixels. As shown in FIG. 9(b), cells in the second intermediate-resolution image D31-2 each have 3×3 pixels. As shown in FIG. 9(c), cells in the third intermediate-resolution image D31-3 each have 4×4 pixels.

FIGS. 9(a) to 9(c) show a case in which a larger number of, e.g., eight, low-resolution images are used, and the number of pixels that are projected is larger (eight), than in the case of FIGS. 5(a) to 5(d). The centers of the pixels are indicated by a mark "•". Among the projected pixels, seven pixels are indicated by a mark "○". The pixel projected from the reference image is positioned at the center of the cell, but is indicated by a mark "□" shifted a little toward the upper left.

The pixels in the low-resolution images DIN are projected in the cells in the intermediate-resolution images D31-1, D31-2, D31-3, at positions respectively corresponding to their position shift amounts, and are used for defining (determining) the pixel values of the pixels having pixel ranges to which the projected positions belong.

The pixels projected from the reference image are positioned at the centers of the cells. When the four pixel ranges are in abutment on each other at the center of a cell, as in the case of the intermediate enlargement factor N1=2, and in the case of the intermediate enlargement factor N3=4, subsequent processes are made on the assumption that the projected position is in one of the four pixel ranges, e.g., the pixel range at a position shifted toward the upper left. This is why the projected position is indicated at a position shifted a little toward the upper left from the center of the cell in FIGS. 9(a) to 9(c).

In the intermediate-resolution image generating unit 31-1, four pixels are projected in the pixel range of the pixel P1, among the pixels P1 to P4 in a cell in the intermediate-resolution image D31-1, two pixels are projected in the pixel range of the pixel P2, and one pixel each is projected in the pixel range of the pixel P3 and the pixel range of the pixel P4. In this case, the pixel value of the pixel P1 is defined by combining (taking an average of making a selection among) the pixel values of the four pixels projected in the pixel range of the pixel P1, the pixel value of the pixel P2 is defined by combining (taking an average of making a selection among) the pixel values of the two pixels projected in the pixel range of the pixel P2, the pixel value of the pixel P3 is defined by the pixel value of the single pixel projected in the pixel range of the pixel P3, and the pixel value of the pixel P4 is defined by the pixel value of the single pixel projected in the pixel range of the pixel P4. As a result, the pixel value is defined for all the four pixels, as shown in FIG. 9(d).

In the intermediate-resolution image generating unit 31-2, one pixel each is projected in the pixel ranges of the pixels P1, P2, P4, P6, P7, among the pixels P1 to P9 in a cell in the intermediate-resolution image D31-2, and the pixel values of the projected pixels are defined as the pixel values of these pixels. Three pixels are projected in the pixel range of the pixel P5, and the pixel value of the pixel P5 is defined by combining (taking an average or making a selection among) the pixel values of the three pixels projected in the pixel range of the pixel P5.

No pixel is projected in the pixel ranges of the pixels P3, P8, P9, so that the pixel values of these pixels P3, P8, P9 are not defined.

In FIG. 9(e), the pixels whose pixel values are defined are indicated by white (no hatching), whereas the pixels whose pixel values are undefined are indicated by hatching.

In the intermediate-resolution image generating unit 31-3, one pixel each is projected in the pixel ranges of the pixels P1, P5, P11, P14, among the pixels P1 to P16 in a cell in the intermediate-resolution image D31-3, and the pixel values of the projected pixels are defined as the pixel values of these pixels. Two pixels each are projected in the pixel ranges of the pixels P6, P7, the pixel value of the pixel P6 is defined by combining (taking an average or making a selection among) the pixel values of the two pixels projected in the pixel range of the pixel P6, and the pixel value of the pixel P7 is defined by combining (taking an average or making a selection among) the pixel values of the two pixels projected in the pixel range of the pixel P7.

No pixel is projected in the pixel ranges of the pixels P2 to P4, P8 to P10, P12, P13, P15, P16, so that the pixel values of these pixels P2 to P4, P8 to P10, P12, P13, P15, P16 are not defined.

In FIG. 9(f), the pixels whose pixel values are defined are indicated by white (no hatching), whereas the pixels whose pixel values are undefined are indicated by hatching.

In the manner described above, the intermediate-resolution images D31-1, D31-2, D31-3 in which at least part of the pixels are valid pixels, in other words, which include valid pixels which are pixels whose pixel values are defined are generated. The generated intermediate-resolution images D31-1, D31-2, D31-3 are supplied to the image enlarging units 32-1, 32-2, 32-3, respectively.

The intermediate-resolution image generating units 31-1, 31-2, 31-3 generate and output, in addition to the above-mentioned intermediate-resolution images D31-1, D31-2, D31-3, information (validity information) D31v-1, D31v-2, D31v-3 indicating whether each pixel is a valid pixel or an undefined pixel. This information is utilized in the image selection unit 41b to be described later.

The image enlarging units 32-1, 32-2, 32-3 respectively generate filled intermediate-resolution images by filling the undefined pixels in the intermediate-resolution images D31-1, D31-2, D31-3 with an estimated value, and enlarge the filled intermediate-resolution images to a size (number of pixels) identical to that of the high-resolution image DOUT, and output the resultant images as the intermediate-resolution enlarged images D3-1, D3-2, D3-3. As the estimated value of each undefined pixel, an average value of the pixel values of the valid pixels neighboring the undefined pixel, or the pixel value of the valid pixel closest to the undefined pixel may be used. If, in the latter case, there are a plurality of valid pixels which are the closest, an average value of such a plurality of valid pixels or the pixel value of the pixel selected from such a plurality of valid pixels according to a predefined rule may be used.

The enlargement by the image enlarging units 32-1, 32-2, 32-3 is performed by a filter computation process, such as a bilinear method, or a bicubic method, as in the case of the enlargement by the image enlarging unit in the first embodiment. However, the enlargement factor Sc1 of the image enlarging unit 32-1 is M/N1=5/2; the enlargement factor Sc2 of the image enlarging unit 32-2 is M/N2=5/3; and the enlargement factor Sc3 of the image enlarging unit 32-3 is M/N3=5/4.

By the filling of the undefined pixels and the enlargement described above, the intermediate-resolution enlarged images D3-1, D3-2, D3-3 in which the pixel values of all the pixels are defined are generated.

As has been described, the intermediate-resolution enlarged image generating modules 3-1, 3-2, 3-3 generate the first to third intermediate-resolution images D31-1, D31-2, D31-3 having resolutions corresponding to a plurality of mutually different intermediate enlargement factors N1, N2, N3, enlarge the first to third intermediate-resolution images D31-1, D31-2, D31-3 after filling undefined pixels with a pixel value, to generate the first to third intermediate-resolution enlarged images D3-1, D3-2, D3-3 having the number of pixels identical to that of the high-resolution image DOUT of the target enlargement factor M.

The intermediate-resolution enlarged images D3-1, D3-2, D3-3 generated by the intermediate-resolution enlarged image generating modules 3-1, 3-2, 3-3 are supplied to the high-resolution image filling unit 4b.

Figure 10:
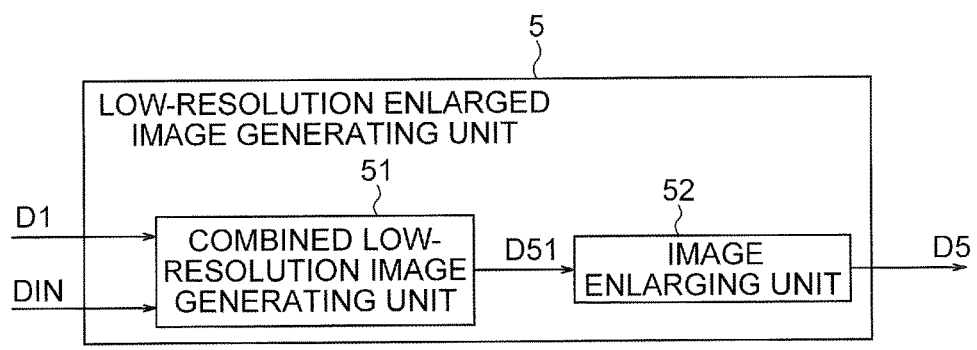
FIG. 10 is a block diagram showing an exemplary configuration of a low-resolution enlarged image generating unit in the second embodiment.

As shown in FIG. 10, the low-resolution enlarged image generating unit 5 includes a combined low-resolution image generating unit 51 and an image enlarging unit 52.

The combined low-resolution image generating unit projects pixels in the plurality of (eight) low-resolution images DIN onto the low-resolution image space, at the pixel positions, and associates (performs registration), based on the projected positions, the pixels in the low-resolution images DIN with the pixels in the low-resolution image space, thereby to generate an image D51 having the same resolution as the low-resolution images DIN. The image generated by the combined low-resolution image generating unit 51 is called a combined low-resolution image, as it is generated by combining the plurality of low-resolution images DIN. For distinction, the low-resolution images DIN may be called input low-resolution images.

Figure 11A:
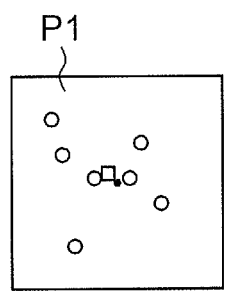
FIGS. 11(a) and 11(b) are diagrams showing generation of a combined low-resolution image by means of projection from low-resolution images in the second embodiment.

FIG. 11(a) shows the projected positions in a cell in the combined low-resolution image when the pixels corresponding to each other (pixels having position shifts relative to each other) in the plurality of low-resolution images are projected in the combined low-resolution image space.

As shown in FIG. 11(a), each cell in the combined low-resolution image D51 consists of one pixel.

FIG. 11(a) shows a case in which eight pixels are projected, as in the case of FIGS. 9(a) to 9(c). The center of the pixel is indicated by a mark "•". Among the projected pixels, seven pixels are indicated by a mark "○". The pixel projected from the reference image is positioned at the center of the cell, but is indicated by a mark "□" shifted a little toward the upper left. This is for consistency with FIGS. 9(a) to 9(c).

The pixels in the low-resolution images DIN are projected in the corresponding cells in the combined low-resolution image D51, at positions respectively corresponding to their position shift amounts, and are used for defining (determining) the pixel values of the pixels having pixel ranges to which the projected positions belong.

In the combined low-resolution image D51, each cell consists of a pixel. Accordingly, all the pixels will become valid pixels.

In the example shown in FIG. 11(a), the combined low-resolution image generating unit 51 projects eight pixels into the pixel range of the pixel P1 in a cell in the combined low-resolution image D51.

In this case, the pixel value of the pixel P1 is defined by combining (taking an average or making a selection among) the pixel values of the eight pixels projected in the pixel range of the pixel P1.

Figure 11B:
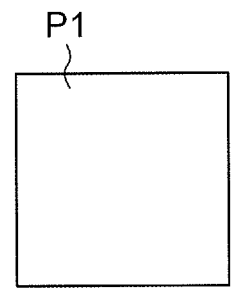

FIG. 11(b) indicates, by white (no hatching), that the pixel P1 in the combined low-resolution image D51 is a pixel whose value is defined.

Thus, the combined low-resolution image D51 in which the pixel values of all the pixels are defined is generated. The generated combined low-resolution image D51 is supplied to the image enlarging unit 52.

The image enlarging unit 52 enlarges the combined low-resolution image D51 to a size (number of pixels) identical to that of the high-resolution image DOUT, and outputs the resultant image as a low-resolution enlarged image D5.

The enlargement by the image enlarging unit 52 is performed by a filter computation process, such as a bilinear method, or a bicubic method, as in the enlargement by the image enlarging unit 32 in the first embodiment. However, the enlargement factor Sc0 of the image enlarging unit 52 is equal to the target enlargement factor M(=5). As a result of the enlargement, the low-resolution enlarged image D5 in which the pixel values of all the pixels are defined is generated.

As has been described, the low-resolution enlarged image generating unit 5 generates the combined low-resolution image D51 having the same resolution as the low-resolution images DIN, and enlarges the generated combined low-resolution image D51 to generate the low-resolution enlarged image D5 having the same number of pixels as the high-resolution image DOUT of the target enlargement factor M.

The low-resolution enlarged image D5 generated by the enlarged image generating unit 5 is supplied to the high-resolution image filling unit 4b.

The low-resolution enlarged image generating unit 5 has a configuration which is similar to those of the intermediate-resolution enlarged image generating modules 3-1 to 3-3, and in which the intermediate enlargement factor is 1. Accordingly, by preparing a plurality of intermediate-resolution enlarged image generating modules 3-i (i=1, 2, . . . ) in which the intermediate enlargement factor can be set to an arbitrary value not smaller than 1, one of the intermediate-resolution enlarged image generating modules 3-i can be made to serve as the low-resolution enlarged image generating unit 5 by setting the intermediate enlargement factor to 1.

In this case, the low-resolution enlarged image generating unit 5 can be regarded as a unit for generating the enlarged image (low-resolution enlarged image) D5 by enlarging the intermediate-resolution image (combined low-resolution image) D51 having been generated with the intermediate enlargement factor being set to 1.

For each of the undefined pixels in the initial high-resolution image D2, the high-resolution image filling unit 4b selects one of the first to third intermediate-resolution enlarged images D3-1, D3-2, D3-3, and the low-resolution enlarged image D5, and estimates the pixel value of the undefined pixel using the pixel value of the corresponding pixel in the selected enlarged image. By this estimation, the undefined pixel is filled with a pixel value.

FIG. 12 is a block diagram showing an exemplary configuration of the high-resolution image filling unit 4b.

The illustrated high-resolution image filling unit 4b includes an image selection unit 41b and a pixel filling unit 42.

The image selection unit 41b successively takes each of the undefined pixels in the initial high-resolution image D2, as a pixel of interest, receives the validity information D31v-1, D31v-2, D31v-3 pertaining to the respective pixels in the regions surrounding the positions in the intermediate-resolution images D31-1, D31-2, D31-3 of the plurality of (three) intermediate enlargement factors N1, N2, N3, corresponding to the position of the pixel of interest, calculates the valid pixel ratios RD1, RD2, RD3 for the surrounding regions, decides, based on the calculated valid pixel ratios RD1, RD2, RD3, which of the first to third intermediate-resolution enlarged images D3-1, D3-2, D3-3 and the low-resolution enlarged image D5 is to be selected, and outputs information (image selection information) D41 indicating the result of the decision.

If the low-resolution enlarged image generating unit 5 is regarded as a unit for generating the enlarged image (low-resolution enlarged image) D5 by enlarging the intermediate-resolution image (combined low-resolution image) D51 generated with the intermediate enlargement factor set to 1, as mentioned above, the image selection information D41 can be regarded as intermediate enlargement factor selection information for selecting the intermediate enlargement factor of the intermediate-resolution image used for the generation of the enlarged image (intermediate-resolution enlarged image or the low-resolution enlarged image) to be used for filling the undefined pixel in the initial high-resolution image D2.

The pixel filling unit 42 successively takes each of the undefined pixels in the initial high-resolution image D2 as a pixel of interest, and selects the enlarged image indicated by the image selection information D41 (one that is determined to be selected among the intermediate-resolution enlarged images D3-1, D3-2, D3-3 and the low-resolution enlarged image D5), and estimates the pixel value of the pixel of interest using the pixel value of the pixel in the selected enlarged image corresponding to the pixel of interest.

By this estimation, the pixel of interest is filled with a pixel value.

The image selection unit 41b includes a valid pixel ratio calculation unit 411 and a selection information generating unit 412.

The valid pixel ratio calculation unit 411 receives the validity information D31v-1, D31v-2, D31v -pertaining to respective pixels in the surrounding regions of a predetermined size centered around positions in the intermediate-resolution images D31-1, D31-2, D31-3 corresponding to the position of the pixel of interest, and calculates the valid pixel ratios RD1, RD2, RD3 for the surrounding regions.

The valid pixel ratio RDi (i is 1, 2 or 3) is a ratio of the valid pixels (pixels whose pixel values are defined) among the pixels in the above-mentioned surrounding region in the intermediate-resolution image D31-i.

If the surrounding region for which the valid pixel ratio RDi is calculated is a region consisting of Nsi×Nsi pixels, the calculation for determining the valid pixel ratio RDi for the surrounding region is as represented by the equation (2). In the present embodiment, the size Nsi×Nsi of the surrounding region is the same as the size of the cell in the intermediate-resolution image D31-i (the number of the pixels in the cell being Ni×Ni), that is Nsi is the same as the intermediate enlargement factor Ni. But, these sizes may differ from each other.

$$RDi = Fi/(Nsi \times Nsi) \tag{2}$$

In the equation (2), Fi represents the number of valid pixels (pixels whose pixel values are defined by the projection from the low-resolution images) in the above-mentioned surrounding region (region consisting of Nsi×Nsi pixels).

That is, for the intermediate-resolution image D31-1 generated with the intermediate enlargement factor N1, $$RD1 = F1/(Ns1 \times Ns1) \tag{2a}$$

For the intermediate-resolution image D31-2 generated with the intermediate enlargement factor N2, $$RD2 = F2/(Ns2 \times Ns2) \tag{2b}$$

For the intermediate-resolution image D31-3 generated with the intermediate enlargement factor N3, $$RD3 = F3/(Ns3 \times Ns3) \tag{2c}$$

In the example shown in FIGS. 9(d), 9(e), 9(f), F1, F2, F3 are 4, 6, 6, respectively, and the valid pixel ratios RD1, RD2, RD3 are respectively as follows:

$$RD1 = 4/4 \; (=1)$$

$$RD2 = 6/9 (= 0.667)$$

RD3=6/16(=0.375)

For the calculation of the valid pixel ratio RDi, whether each pixel in the intermediate-resolution image D31-i is a valid pixel or an undefined pixel needs to be known. Accordingly, the valid pixel ratio calculation unit 411 uses the validity information D31v-i for each pixel in each intermediate-resolution image, output from the intermediate-resolution image generating unit 31-i for performing the calculation of the equation (2) to determine the valid pixel ratio RDi.

The valid pixel ratio RDi in the equation (2) is determined for each of the undefined pixels in the initial high-resolution image D2, and for each of the intermediate-resolution images D31-1, D31-2, D31-3.

The selection information generating unit 412 decides which image among the intermediate-resolution enlarged images D3-1, D3-2, D3-3, and the low-resolution enlarged image D5 is to be selected, based on the valid pixel ratios RD1, RD2, RD3 for the respective intermediate enlargement factors N1, N2, N3, output from the valid pixel ratio calculation unit 411, and outputs information indicating the result of the decision as the image selection information D41. This decision is made for each of the undefined pixels in the initial high-resolution image D2. For instance, the undefined pixels in the high-resolution image are successively selected, and the decision is made for the selected pixel (pixel of interest).

For example, when any of the valid pixel ratios RDi calculated in the manner described above is not smaller than a threshold value (valid pixel ratio threshold value) RDth, the selection information generating unit 412 selects, the intermediate-resolution enlarged image generated from the intermediate-resolution image having the largest intermediate enlargement factor, among the intermediate-resolution images of which the valid pixel ratio is not smaller than the threshold value RDth, and outputs information indicating the selected intermediate-resolution enlarged image as the image selection information D41. The above-mentioned threshold value RDth is for example 0.6.

In the case shown in FIGS. 9(d), 9(e), 9(f), RD1 (=4/4), and RD2 (=6/9) are not smaller than the threshold value RDth (0.6), and the largest intermediate enlargement factor among the intermediate enlargement factors corresponding to these valid pixel ratios is N2, so that information indicating the intermediate enlargement factor N2, that is, information indicating the intermediate-resolution enlargement image generated from the intermediate-resolution image having the intermediate enlargement factor N2 is output as the image selection information D41.

When the valid pixel ratio RDi is smaller than the threshold value RDth for all of the intermediate-resolution images D31-1, D31-2, D31-3, the image selection unit 41b outputs the image selection information D41 indicating that the low-resolution enlarged image D5 is to be selected.

The pixel filling unit 42 successively selects the undefined pixels in the initial high-resolution image D2 as a pixel of interest, selects one of the intermediate-resolution enlarged images D3-1, D3-2, D3-3 and the low-resolution enlarged image D5, according to the image selection information D41 output from the selection information generating unit 412 for the pixel of interest, and estimates the pixel value of the pixel of interest, using the pixel value of the pixel in the selected enlarged image, corresponding to the pixel of interest.

By this estimation, the pixel of interest is filled with a pixel value, and the pixel filled with a pixel value becomes a pixel in the high-resolution image DOUT.

By performing such a filling process with regard to all the undefined pixels in the initial high-resolution image D2, the high-resolution image DOUT in which the pixel values of all the pixels are defined is generated.

According to the second embodiment, in addition to the effects similar to those of the first embodiment, the following additional effects are obtained. That is, by generating the intermediate-resolution images D31-1, D31-2, D31-3 having resolutions of a plurality of intermediate enlargement factors, enlarging these intermediate-resolution images after filling their undefined pixels with an estimated value, to generate a plurality of intermediate-resolution enlarged images D3-1, D3-2, D3-3, and selecting the optimum image among the intermediate-resolution enlarged images D3-1, D3-2, D3-3 and the low-resolution enlarged image D5, based on the valid pixel ratios RD1, RD2, RD3 for the intermediate-resolution images D31-1, D31-2, D31-3, it is possible to generate the high-resolution image with a more uniform picture quality, than by the conventional method in which estimation is made from the proximate pixels, even when the distribution of the valid pixels is uneven, or the ratio of the valid pixels is insufficient.

In particular, the position shifts in the images are for example due to translation, shear, rotation, homography or the like, and in the case of homography, the distribution of the valid pixels becomes uneven, and varies with the position within the image, and there will be areas where the ratio of the valid pixels is insufficient. In such areas where the ratio of the valid pixels is insufficient, the pixels in the intermediate-resolution enlarged image generated from the intermediate-resolution image having a smaller intermediate enlargement factor or the pixels in the low-resolution enlarged image are used. In areas where the ratio of the valid pixels is large, the pixels in the intermediate-resolution enlarged image generated from the intermediate-resolution image having a larger intermediate enlargement factor are used. In this way, the undefined pixels are stably filled with a pixel value, and the reproducibility of high-frequency components is improved.

The description so far relates to the case where three intermediate-resolution enlarged images having different intermediate resolutions are generated by the intermediate-resolution enlarged image generating unit 3b. This however does not impose a limitation. The invention is applicable to cases where two, or four or more intermediate-resolution enlarged images with different intermediate resolutions are generated.

To generalize, it is satisfactory if the intermediate-resolution enlarged image generating unit 3b generates first to Ith (I being an integer not smaller than two) intermediate-resolution images D31-1 to D31-I, by projection of pixels from the low-resolution images DIN, onto the image spaces having resolutions of first to Ith intermediate enlargement factors which are mutually different, and enlarges the first to Ith intermediate-resolution images D31-1 to D31-I, after filling their undefined pixels with an estimated value, to generate the first to Ith intermediate-resolution enlarged images D3-1 to D3-I having the same number of pixels as the high-resolution image DOUT, and the high-resolution image filling unit 4b selects one of the first to Ith intermediate-resolution enlarged images D3-1 to D3-I and the low-resolution enlarged image D5, and estimates the pixel value of the undefined pixel in the initial high-resolution image D2 based on the pixel value of the corresponding pixel in the selected enlarged image.

For example, it is satisfactory if the high-resolution image filling unit 4b successively selects the undefined pixels in the initial high-resolution image D2 as a pixel of interest, selects one of the intermediate-resolution enlarged images D3-1 to D3-I and the low-resolution enlarged image D5, based on the valid pixel ratios RD1 to RDI indicating the ratios of the pixels having their pixel values defined by projection from the low-resolution images DIN, in the regions surrounding the positions in the first to Ith intermediate-resolution images D31-1 to D31-I, corresponding to the position of the pixel of interest, and estimates the pixel value of the pixel of interest using the pixel value of the above-mentioned corresponding pixel in the selected enlarged image.

More specifically, it is satisfactory if the high-resolution image filling unit 4b selects the intermediate-resolution enlarged image generated from the intermediate-resolution image whose intermediate enlargement factor is the largest among the intermediate-resolution images of which a ratio (valid pixel ratio) RDi of pixels with their pixel values defined by projection from the low-resolution images, in the above-mentioned surrounding region is not smaller than a predetermined threshold value (RDth), and selects the low-resolution enlarged image when the above-mentioned valid pixel ratio RDi is smaller than the above-mentioned threshold value (RDth) with regard to all of the intermediate-resolution images D311 to D31-I.

In the above-described embodiment, the intermediate-resolution enlarged image generating unit generates a plurality of intermediate-resolution enlarged images. But the intermediate-resolution enlarged image generating unit may generate only one intermediate-resolution enlarged image. In such a case, either of the intermediate-resolution enlarged image and the low-resolution enlarged image is selected. For instance, it may be so configured that if the valid pixel ratio with regard to the single intermediate-resolution image is not smaller than a threshold value, the intermediate-resolution enlarged image is selected; otherwise, the low-resolution enlarged image is selected.

Third Embodiment

Figure 13:
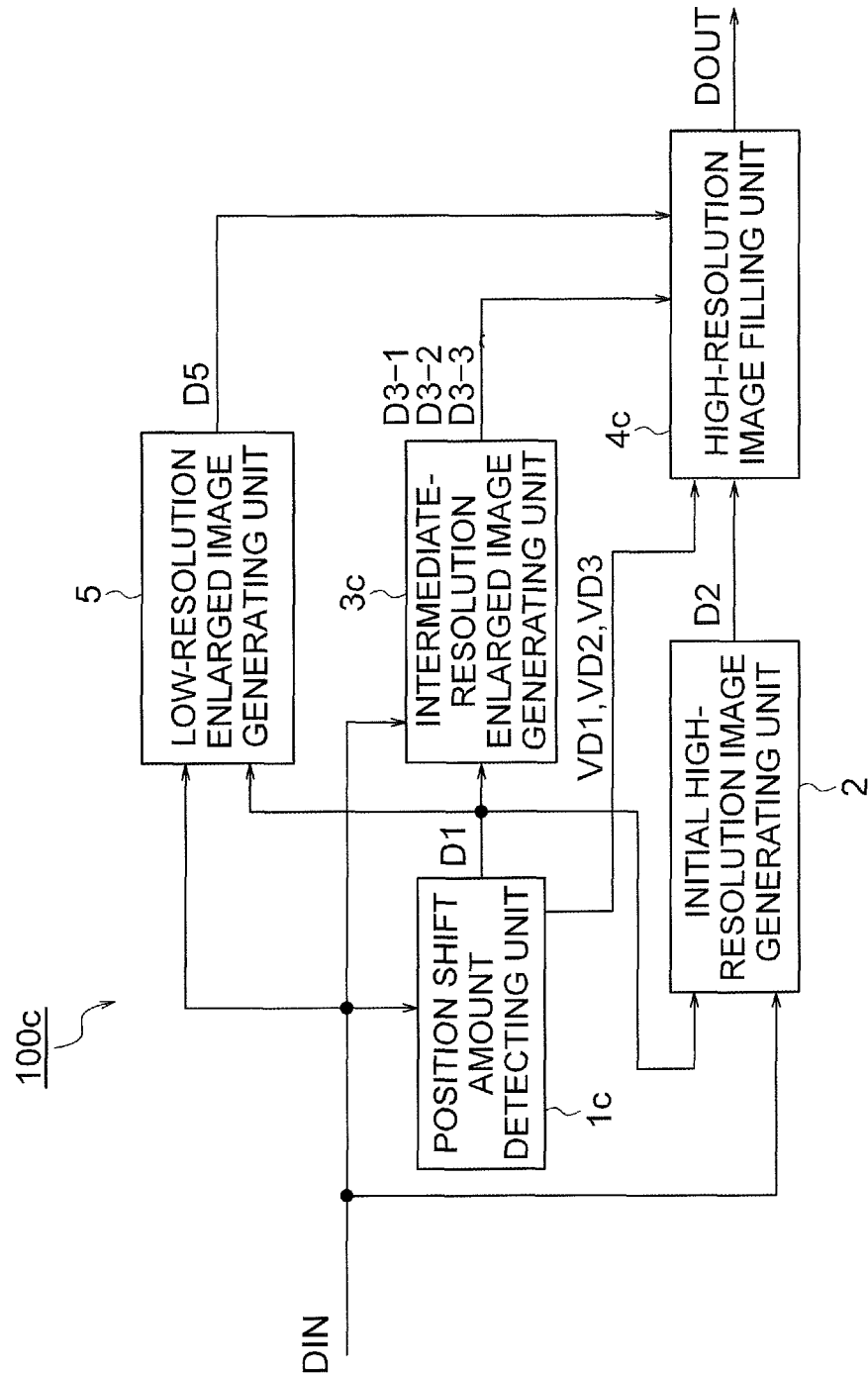
FIG. 13 is a block diagram showing an image processing apparatus according to a third embodiment of the present invention.

FIG. 13 is a block diagram showing an image processing apparatus 100c according to a third embodiment of the present invention.

The illustrated image processing apparatus 100c is generally identical to the image processing apparatus 100b shown in FIG. 7. But a position shift amount detecting unit 1c is used in place of the position shift amount detecting unit 1, an intermediate-resolution enlarged image generating unit 3c is used in place of the intermediate-resolution enlarged image generating unit 3b, and a high-resolution image filling unit 4c is used in place of the high-resolution image filling unit 4b.

The position shift amount detecting unit 1c is similar to the position shift amount detecting unit 1, but differs in that it has functions of generating and outputting projected position shift amount information VD1 to VD3. The projected position shift amount information VD1 to VD3 indicates the projected position shift amounts in the regions surrounding the positions in the plurality of (three) intermediate-resolution images D31-1, D31-2, D31-3 having intermediate enlargement factors N1, N2, N3, corresponding to the position of the pixel of interest.

The intermediate-resolution enlarged image generating unit 3c is similar to the intermediate-resolution enlarged image generating unit 3b, but need not have the functions of generating and outputting the validity information D31v-1, D31v-2, D31v-3.

Figure 14:
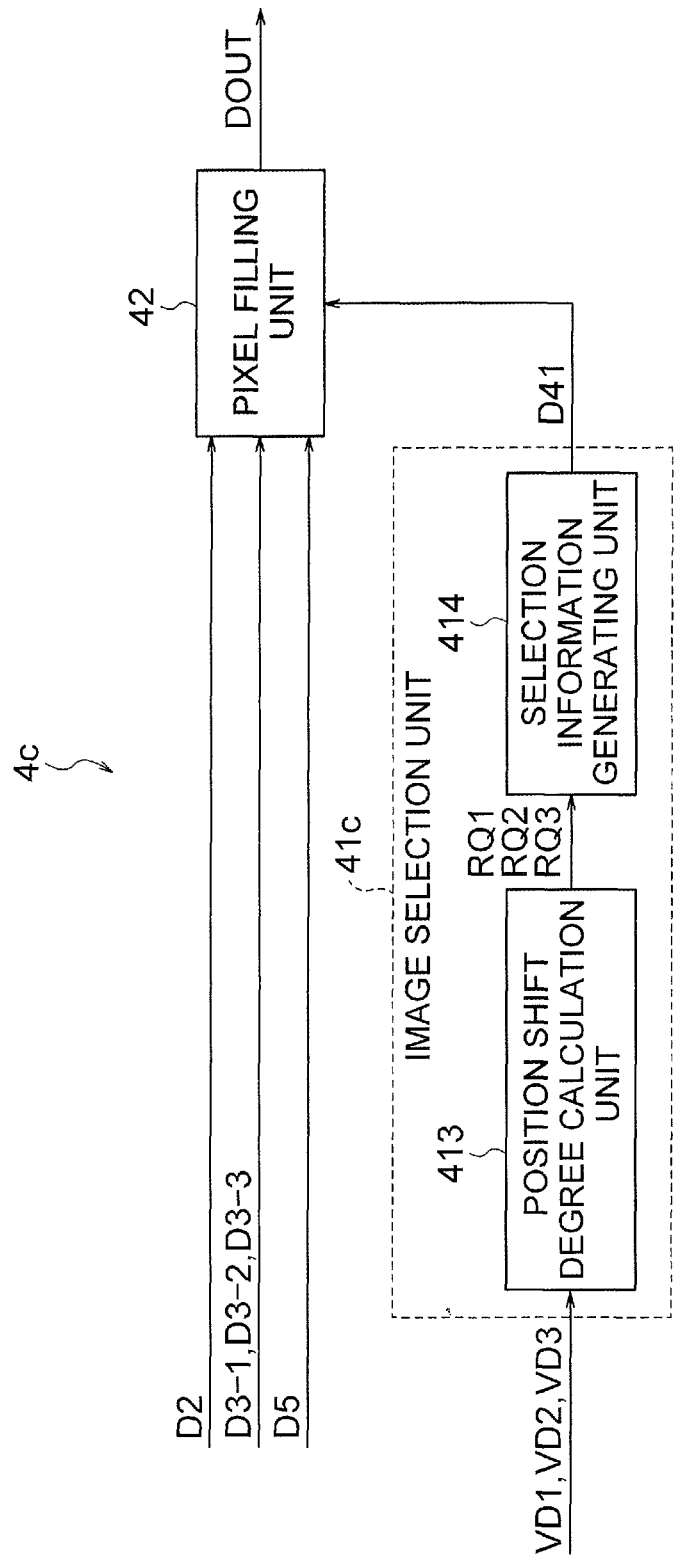
FIG. 14 is a block diagram showing an exemplary configuration of a high-resolution image filling unit in the third embodiment.

An exemplary configuration of the high-resolution image filling unit 4c is shown in FIG. 14. The illustrated high-resolution image filling unit 4c includes an image selection unit 41c and a pixel filling unit 42. The pixel filling unit 42 is similar to the pixel filling unit 42 shown in FIG. 12.

The image selection unit 41c successively takes each of undefined pixels in the initial high-resolution image D2 as a pixel of interest, receives the projected position shift amount information VD1, VD2, VD3 indicating the projected position shift amounts in the regions surrounding the positions in the intermediate-resolution images D31-1, D31-2, D31-3, corresponding to the position of the pixel of interest, calculates the degrees (position shift degrees) RQ1, RQ2, RQ3 of the shifts in the projected positions in the above-mentioned surrounding regions, decides, based on the calculated position shift degrees RQ1, RQ2, RQ3, which of the first to third intermediate-resolution enlarged images D3-1, D3-2, D3-3 and the low-resolution enlarged image D5 is to be selected, and outputs the image selection information D41 indicating the result of the decision.

The image selection unit 41c includes a position shift degree calculation unit 413 and a selection information generating unit 414.

The position shift degree calculation unit 413 receives the projected position shift amount information VD1, VD2, VD3 indicating the projected position shift amounts in the surrounding regions of a predetermined size, centered around the positions in the intermediate-resolution images D31-1, D31-2, D31-3, corresponding to the position of the pixel of interest, and calculates the position shift degrees RQ1, RQ2, RQ3 in the surrounding regions.

The position shift degree RQi (i is 1, 2 or 3) is an index representing the degree of the shifts in the projected positions of a plurality pixels from the low-resolution images, in the above-mentioned surrounding region, and is given, for example, by an average (or a value proportional to the average) of distances between the projected positions of respective pixels in the low-resolution images DIN and the centers of the pixel ranges (in the intermediate-resolution image) to which the projected positions belong. When the number of the projected positions in each cell is the same among the intermediate-resolution images D31-1, D31-2, D31-3 as in the example of FIGS. 9(a) to 9(c), a sum of the above-mentioned distances is a value proportional to the average. In the following description, it is assumed that such a sum is determined as the value proportional to the average.

If the surrounding region for which the position shift degree RQi is calculated is a region consisting of Nti×Nti pixels, computation for determining the position shift degree RQi for the surrounding region is represented by the equation (3).

In the present embodiment, the size Nti×Nti of the surrounding region is identical to the size of the cell (the number of pixels in the cell, Ni×Ni) in each intermediate-resolution image. But, these sizes may differ from each other.

[Mathematical Expression 1]

$$RQi = \sum_{j=1}^{J_i} \sqrt{(x_j - x_{jc})^2 + (y_j - y_{jc})^2} \qquad (3)$$

In the equation (3), $(x_j, y_j)$ are coordinates of each of the projected positions, namely the jth projected position (indicated by a mark "○" in FIGS. 9(a) to 9(c)) of the pixels from the low-resolution images DIN, in the above-mentioned cell, and $(x_{jc}, y_{jc})$ are coordinates of the center (indicated by a mark "•") of the pixel range to which the jth projected position in the cell belongs.

$J_i$ (i is 1, 2 or 3) is the number of the pixels projected in the cell, and $J_1=J_2=J_3=8$ in the example shown in FIGS. 9(a) to 9(c).

$(x_j-x_{jc})$ and $(y_j-y_{jc})$ represent the shift (projected position shift) of the jth projected position with respect to the center of the pixel range to which the projected position belongs, i.e., the differences in the horizontal axis direction and the vertical axis direction. The projected position shift is represented by two-dimensional coordinates $(x_j-x_{jc}, y_j-y_{jc})$.

Vectors VD2-j representing $(x_j-x_{jc}, y_j-y_{jc})$ for the case where the intermediate enlargement factor Ni is 3 are shown in FIG. 9(g). In FIG. 9(g), arrow marks and reference characters "VD2-j" are attached only to those vectors VD2-j that are relatively large.

The projected position shift amounts VD1-j (j=1 to $J_1$), VD2-j (j=1 to $J_2$), VD3-j (j=1 to $J_3$) at the time of generating the intermediate-resolution images in the intermediate-resolution image generating units 31-1, 31-2, 31-3 are detected by, for example, the position shift amount detecting unit 1c, the projection position shift amount information VD1, VD2, VD3 representing the projected position shift amounts having been detected is supplied from the position shift amount detecting unit 1c to the position shift degree calculation unit 413, and the calculation according to the equation (3) is performed in the position shift degree calculation unit 413 to determine the position shift degree RQi.

The projected position shift amounts VDi-j (i is 1, 2 or 3) are calculated based on the position shift amounts (V21, V31, V41 and the like in FIG. 3(c) or FIG. 5(c)). That is, the projected shift amounts are determined by calculating the projected positions based on the position shift amounts, and determining the differences of the projected positions with respect to the central position of the pixel in the intermediate-resolution image of each enlargement factor (the central position being calculated in the position shift amount detecting unit 1c based on the intermediate enlargement factor).

The position shift degree RQi in the equation (3) is calculated for each of the undefined pixels in the initial high-resolution image D2 and for each of the intermediate-resolution images D31-1, D31-2, D31-3.

The selection information generating unit 414 decides which image is to be selected among the intermediate-resolution enlarged images D3-1, D3-2, D3-3, and the low-resolution enlarged image D5, based on the position shift degrees RQ1, RQ2, RQ3 for the respective intermediate enlargement factors N1, N2, N3, output from the position shift degree calculation unit 413, and outputs information indicating the result of the decision as the image selection information D41. This selection is performed for each undefined pixel in the initial high-resolution image D2. For example, the undefined pixels in the high-resolution image are successively selected and the selection of the image is made for the selected pixel (pixel of interest).

For example, the selection information generating unit 414 decides that the intermediate-resolution enlarged image generated from the intermediate-resolution image for which the position shift degree RQi calculated in the manner described above is the smallest is optimum, and is to be selected, and outputs information indicating the result of the decision as the image selection information D41.

If, however, the above-mentioned smallest position shift degree is larger than a predetermined threshold value (position shift degree threshold value) RQth, and accordingly the position shift degree RQi is larger than the threshold value RQth for all of the intermediate-resolution images D31-1, D31-2, D31-3, the image selection information D41 indicating that the low-resolution enlarged image D5 is to be selected is output.

As in the second embodiment, the pixel filling unit 42 successively selects the undefined pixels in the initial high-resolution image D2 as a pixel of interest, and selects one of the intermediate-resolution enlarged images D3-1, D3-2, D3-3 and the low-resolution enlarged image D5, according to the image selection information D41 output from the selection information generating unit 414 for the pixel of interest, and estimates the pixel value of the pixel of interest by using the pixel value of the pixel in the selected enlarged image, corresponding to the pixel of interest.

By this estimation, the pixel of interest is filled with a pixel value, and the pixel filled with a pixel value becomes a pixel in the high-resolution image DOUT.

By performing such a filling process for all the undefined pixels in the initial high-resolution image D2, the high-resolution image DOUT in which the pixel values of all the pixels are defined is generated.

Effects similar to those of the second embodiment are also obtained in the third embodiment. However, there are the following differences.

In the third embodiment, the selection of the enlarged image used for filling each undefined pixel in the initial high-resolution image D2 is performed based on the position shift degrees RQi representing the degrees of shifts in the projected positions of the pixels from the low-resolution images. Accordingly, it is possible to use the intermediate-resolution enlarged image generated from the intermediate-resolution image with smaller projected position shifts, thereby to perform estimation of the pixel value with higher accuracy. As a result, even when the distribution of the valid pixels is uneven, the high-resolution image can be generated with a more uniform picture quality.

The description so far relates to the case where three intermediate-resolution enlarged images having different intermediate-resolutions are generated by the intermediate-resolution enlarged image generating unit 3c. The invention is not limited to such a case, and can be applied to cases where two, or four or more intermediate-resolution enlarged images with different intermediate-resolutions are generated.

To generalize, it is satisfactory if the intermediate-resolution enlarged image generating unit 3c, like the intermediate-resolution enlarged image generating unit 3b in the second embodiment, generates first to Ith (I being an integer not smaller than two) intermediate-resolution images D31-1 to D31-I, by projection of pixels from the low-resolution images DIN, onto the image spaces having resolutions of first to Ith intermediate enlargement factors which are mutually different, and enlarges the first to Ith intermediate-resolution images D31-1 to D31-I, after filling their undefined pixels with an estimated value, to generate the first to Ith intermediate-resolution enlarged images D3-1 to D3-I having the same number of pixels as the high-resolution image DOUT, and the high-resolution image filling unit 4c selects one of the first to Ith intermediate-resolution enlarged images D3-1 to D3-I and the low-resolution enlarged image D5, and estimates the pixel value of the undefined pixel based on the pixel value of the corresponding pixel in the selected enlarged image.

For example, it is satisfactory if the high-resolution image filling unit 4c successively selects the undefined pixels in the initial high-resolution image D2 as a pixel of interest, selects one of the intermediate-resolution enlarged images D3-1 to D3-I and the low-resolution enlarged image D5, based on the degrees of shifts (position shift degrees RQi) in the projected positions, in the regions surrounding the positions in the first to Ith intermediate-resolution images D31-1 to D31-I, corresponding to the position of the pixel of interest, and estimates the pixel value of the pixel of interest using the pixel value of the above-mentioned corresponding pixel in the selected enlarged image.

More specifically, it is satisfactory if the high-resolution image filling unit 4c calculates, as the position shift degree RQi for each of the intermediate-resolution images, an average of the shifts in the corresponding projected positions with respect to those pixels which are in the surrounding region and with which the pixels from the low-resolution images DIN are associated by the projection, selects the intermediate-resolution enlarged image generated from the intermediate-resolution image for which the position shift degree RQi is not larger than a predetermined threshold value (RQth), and is the smallest, and selects the low-resolution enlarged image D5 when the position shift degree RQi is larger than the threshold value (RQth) for all of the intermediate-resolution images D31-1 to D31-I.

Incidentally, the configuration may be such that it determines a position shift degree RQ0 for the combined low-resolution image D51, in the same way as is done for the intermediate-resolution images D31-1 to D31-I, selects the enlarged image (one of the intermediate-resolution enlarged images D3-1 to D3-I and the low-resolution enlarged image D5) generated from the image (one of the images D31-1 to D31-I, D51) of which the position shift degree is the smallest among the position shift degrees RQ1 to RQI pertaining to the intermediate-resolution images D31-1 to D31-I and the position shift degree RQ0 pertaining to the combined low-resolution image D51, and uses the selected enlarged image for filling the undefined pixel in the initial high-resolution image D2.

In the above-described embodiment, the intermediate-resolution enlarged image generating unit generates a plurality of intermediate-resolution enlarged images. But the intermediate-resolution enlarged image generating unit may generate only one intermediate-resolution enlarged image. In such a case, either of the intermediate-resolution enlarged image and the low-resolution enlarged image is selected. For instance, it may be so configured that if the position shift degree pertaining to the single intermediate-resolution image is not larger than a threshold value, the intermediate-resolution enlarged image is selected; otherwise, the low-resolution enlarged image is selected. Alternatively, it may be so configured that the position shift degree pertaining to the single intermediate-resolution image and the position shift degree pertaining to the combined low-resolution image are compared with each other, and if the position shift degree pertaining to the intermediate-resolution image is smaller, the intermediate-resolution enlarged image is selected, while if the position shift degree pertaining to the combined low-resolution image is smaller, the low-resolution enlarged image is selected.

Forth Embodiment

Figure 15:
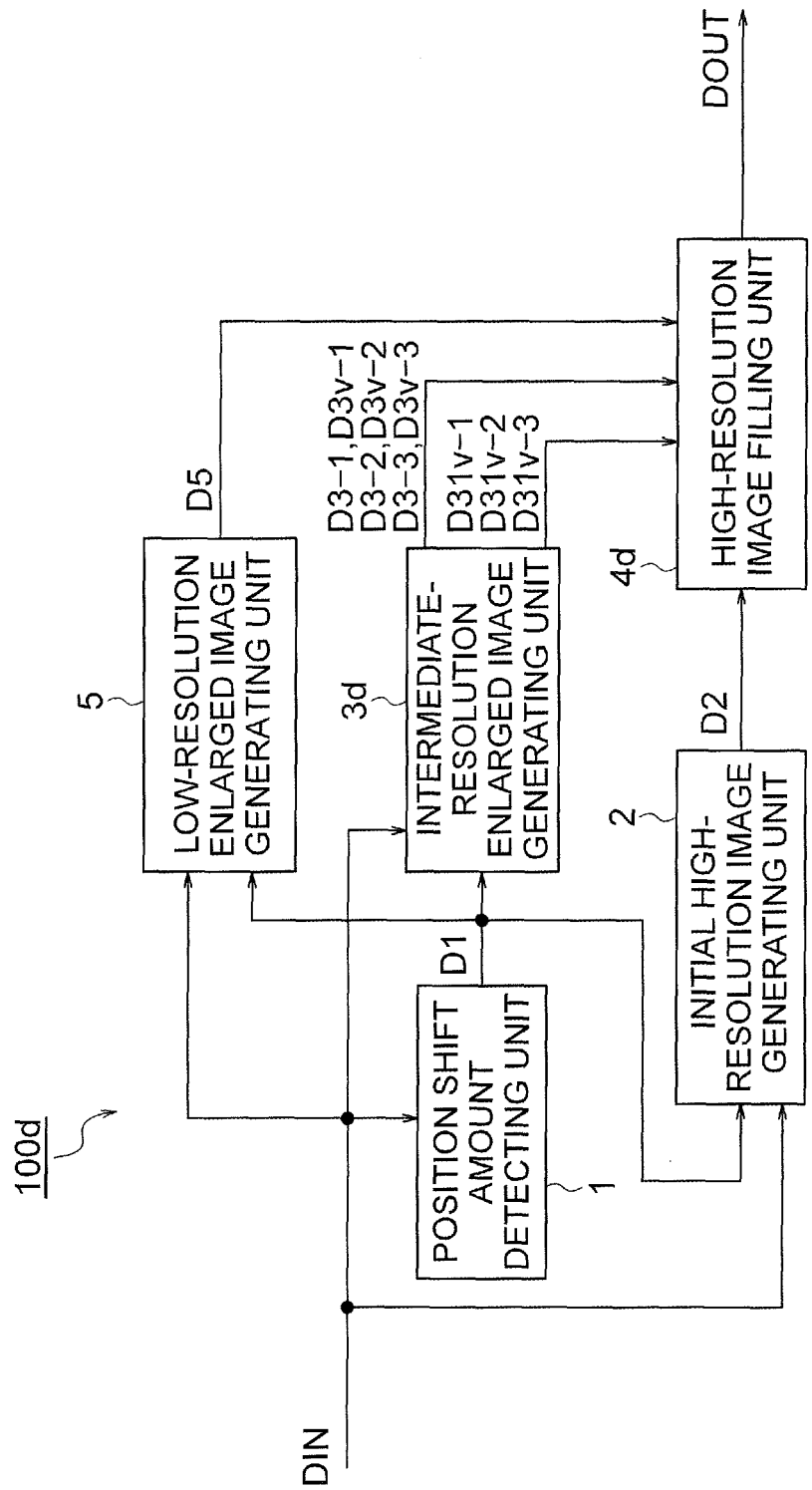
FIG. 15 is a block diagram showing an image processing apparatus according to a fourth embodiment of the present invention.

FIG. 15 is a block diagram showing an image processing apparatus 100d according to a fourth embodiment of the present invention.

The illustrated image processing apparatus 100d is generally identical to the image processing apparatus 100b in FIG. 7, but an intermediate-resolution enlarged image generating unit 3d is used in place of the intermediate-resolution enlarged image generating unit 3b, and a high-resolution image filling unit 4d is used in place of the high-resolution image filling unit 4b.

Figure 16:
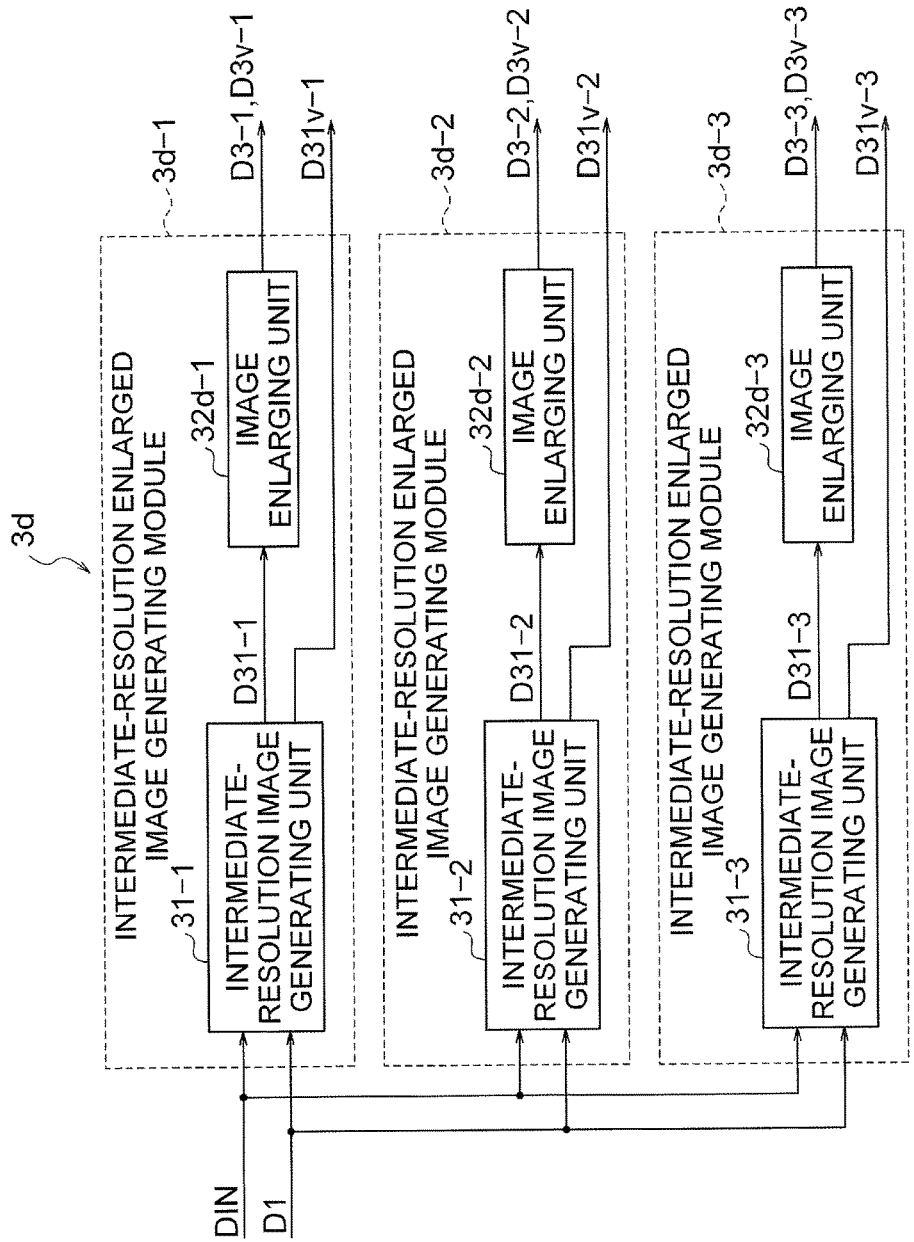
FIG. 16 is a block diagram showing an exemplary configuration of an intermediate-resolution enlarged image generating unit in the fourth embodiment.

An exemplary configuration of the intermediate-resolution enlarged image generating unit 3d is shown in FIG. 16. In FIG. 16, reference characters identical to those in FIG. 8 denote components having the same functions. The illustrated intermediate-resolution enlarged image generating unit 3d includes first to third intermediate-resolution enlarged image generating modules 3d-1 to 3d-3. The first to third intermediate-resolution enlarged image generating modules 3d-1 to 3d-3 are respectively similar to the first to third intermediate-resolution enlarged image generating modules 3-1 to 3-3 in FIG. 8, but differ in the following respects.

The first intermediate-resolution enlarged image generating module 3d-1 includes an intermediate-resolution image generating unit 31-1 and an image enlarging unit 31d-1, the second intermediate-resolution enlarged image generating module 3d-2 includes an intermediate-resolution image generating unit 31-2 and an image enlarging unit 31d-2, and the third intermediate-resolution enlarged image generating module 3d-3 includes an intermediate-resolution image generating unit 31-3 and an image enlarging unit 31d-3.

The intermediate-resolution image generating units 31-1, 31-2, 31-3 are respectively similar to those denoted by the same reference characters in FIG. 8.

The image enlarging units 32d-1, 32d-2, 32d-3 respectively have the same functions as the image enlarging units 32-1, 32-2, 32-3 in FIG. 8, but also generate reliability information D3v-1, D3v-2, D3v-3 indicating, with regard to each pixel in the intermediate-resolution enlarged images D3-1, D3-2, D3-3 generated by the enlargement, whether or not the pixel value has a high reliability, that is, whether the pixel is a high-reliability pixel or a low-reliability pixel.

Whether or not the reliability of the pixel value is high with respect to each pixel is determined based on whether each pixel corresponds to a valid pixel in the intermediate-resolution image D31-i (i is 1, 2 or 3) or corresponds to an undefined pixel.

The correspondence relation between each pixel in the intermediate-resolution image D31-i and each pixel in the intermediate-resolution enlarged image D3-i is determined based on the positional relation when the intermediate-resolution image D31-I and the intermediate-resolution enlarged image D3-i are superimposed with each other. For instance, the pixel, among the pixels in the intermediate-resolution image D31-i, having a pixel range in which each pixel (pixel of interest) in the intermediate-resolution enlarged image D3-i is positioned when the intermediate-resolution image D31-i and the intermediate-resolution enlarged image D3-i are superimposed with each other, is found to be a pixel corresponding to the pixel of interest. If the corresponding pixel is a valid pixel, the pixel of interest is found to be a high-reliability pixel. If the corresponding pixel is an undefined pixel, the pixel of interest is found to be a low-reliability pixel.

Alternatively, one or more pixels, among the pixels in the intermediate-resolution image D31-i, having a center in the vicinity of the position corresponding to the pixel of interest, may be regarded as pixels corresponding to the pixel of interest. If two or more pixels are "corresponding pixels", whether the pixel of interest is a high-reliability pixel or a low-reliability pixel may be determined based on the number of the valid pixels and the number of undefined pixels among the corresponding pixels. In this case, the distance between the centers may be taken into consideration, and the pixels, among the "corresponding pixels", having a smaller distance may be given a greater weight.

Figure 17:
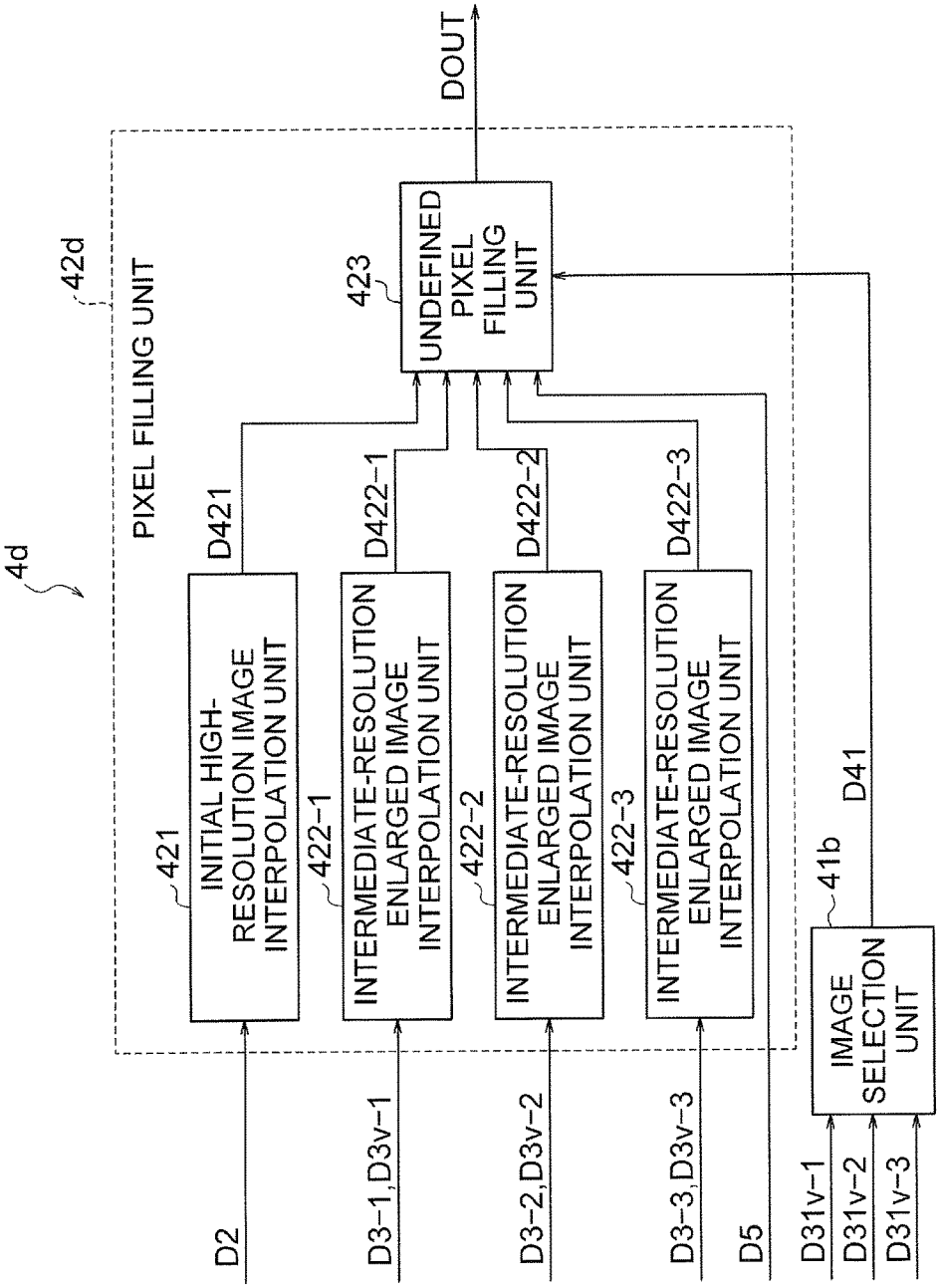
FIG. 17 is a block diagram showing an exemplary configuration of a high-resolution image filling unit in the fourth embodiment of the present invention.

An exemplary configuration of the high-resolution image filling unit 4d is shown in FIG. 17. The illustrated high-resolution image filling unit 4d includes an image selection unit 41b and a pixel filling unit 42d. The image selection unit 41b is identical to the image selection unit 41b in FIG. 12. The pixel filling unit 42d includes an initial high-resolution image interpolation unit 421, intermediate-resolution enlarged image interpolation units 422-1, 422-2, 422-3, and an undefined pixel filling unit 423.

The initial high-resolution image interpolation unit 421 determines, for each of the undefined pixels in the initial high-resolution image D2, a ratio of the pixels (valid pixels) having a defined pixel value, among the proximate pixels, as a valid pixel ratio RE, and interpolates the pixel value of the undefined pixel using the pixel values of the valid pixels in the vicinity if the valid pixel ratio RE is not smaller than a predetermined threshold value (second valid pixel ratio threshold value) REth. This interpolation is performed, for example, by means of a median filter using the valid pixels in the vicinity of the undefined pixel. If the valid pixel ratio RE is smaller than the above-mentioned threshold value REth, the interpolation is not performed, and the undefined pixel is output as is.

The "proximate pixels" are, for example, pixels in a range consisting of Mu×Mu pixels centered around the undefined pixel. Mu is for example equal to M(=5). Similarly, the "valid pixels in the vicinity" are, for example, valid pixels in a range consisting of Mv×Mv pixels centered around the undefined pixel. Mv is for example equal to M(=5). By performing the above processes on all the undefined pixels, an initial high-resolution interpolated image D421 in which part or the entirety of the undefined pixels are interpolated is obtained.

The initial high-resolution interpolated image D421 is supplied to the undefined pixel filling unit 423.

The intermediate-resolution enlarged image interpolation units 422-1, 422-2, 422-3 each determine, for each of the low-reliability pixels in a corresponding one of the intermediate-resolution enlarged images D3-1, D3-2, D3-3, a ratio of the high-reliability pixels, among the proximate pixels, as a high-reliability pixel ratio RF1, RF2, RF3, and interpolate the pixel value of the low-reliability pixel, using the pixel values of the high-reliability pixels in the vicinity, if the high-reliability pixel ratio RF1, RF2, RF3 is not smaller than a corresponding one of predetermined threshold values (high-reliability pixel ratio threshold values) RF1th, RF2th, RF3th. This interpolation is performed, for example, by means of a median filter using the high-reliability pixels in the vicinity of the low-reliability pixel. If the high-reliability pixel ratio RF1, RF2, RF3 is smaller than the corresponding one of the above-mentioned threshold values RF1th, RF2th, RF3th, the interpolation is not performed, and the low-reliability pixel is output as is.

The "proximate pixels" are, for example, pixels in a range consisting of Nu1×Nu1, Nu2×Nu2, Nu3×Nu3 pixels centered around the low-reliability pixel. Nu1, Nu2, Nu3 are for example equal to N1, N2, N3 (=2, 3, 4). Similarly, the "high-reliability pixels in the vicinity" are, for example, high-reliability pixels in a range consisting of Nv1×Nv1, Nv2×Nv2, Nv3×Nv3 pixels centered around the low-reliability pixel. Nv1, Nv2, Nv3 are for example equal to N1, N2, N3 (=2, 3, 4). By performing the above processes on all the low-reliability pixels, intermediate-resolution enlarged interpolated images D422-1, D422-2, D422-3 in which part or the entirety of the low-reliability pixels are have their pixel values replaced with interpolated values are obtained.

The intermediate-resolution enlarged interpolated images D422-1, D422-2, D422-3 are supplied to the undefined pixel filling unit 423.

The undefined pixel filling unit 423 successively selects, as a pixel of interest, the pixels whose pixel values are not defined even after the interpolation by the initial high-resolution image interpolation unit 421, that is, the undefined pixel (initial high-resolution interpolated image undefined pixel) in the initial high-resolution interpolated image D421, and performs the filling in the same method as that performed in the high-resolution image filling unit 4b in the second embodiment. However, in place of the intermediate-resolution enlarged images D3-1, D3-2, D3-3, the intermediate-resolution enlarged interpolated images D422-1, D422-2, D422-3 are used.

That is, when the image selection information D41 indicates that the intermediate-resolution enlarged image D3-i is to be selected, in other words, the intermediate enlargement factor Ni is selected, the undefined pixel filling unit 423 selects the intermediate-resolution enlarged interpolated image D422-i.

In this way, the undefined pixel filling unit 423 selects the image (one of the intermediate-resolution enlarged interpolated images D422-1, D422-2, D422-3 and the low-resolution enlarged image D5 indicated by the image selection information D41, and estimates the pixel value of the pixel of interest using the pixel value of the pixel in the selected image, corresponding to the pixel of interest.

By this estimation, the pixel of interest is filled with a pixel value, and the pixel filled with a pixel value becomes a pixel in the high-resolution image DOUT.

By performing such a filling process on all the undefined pixels in the initial high-resolution interpolated image D421, the high-resolution image DOUT in which the pixel values of all the pixels are defined is generated.

Figure 18:
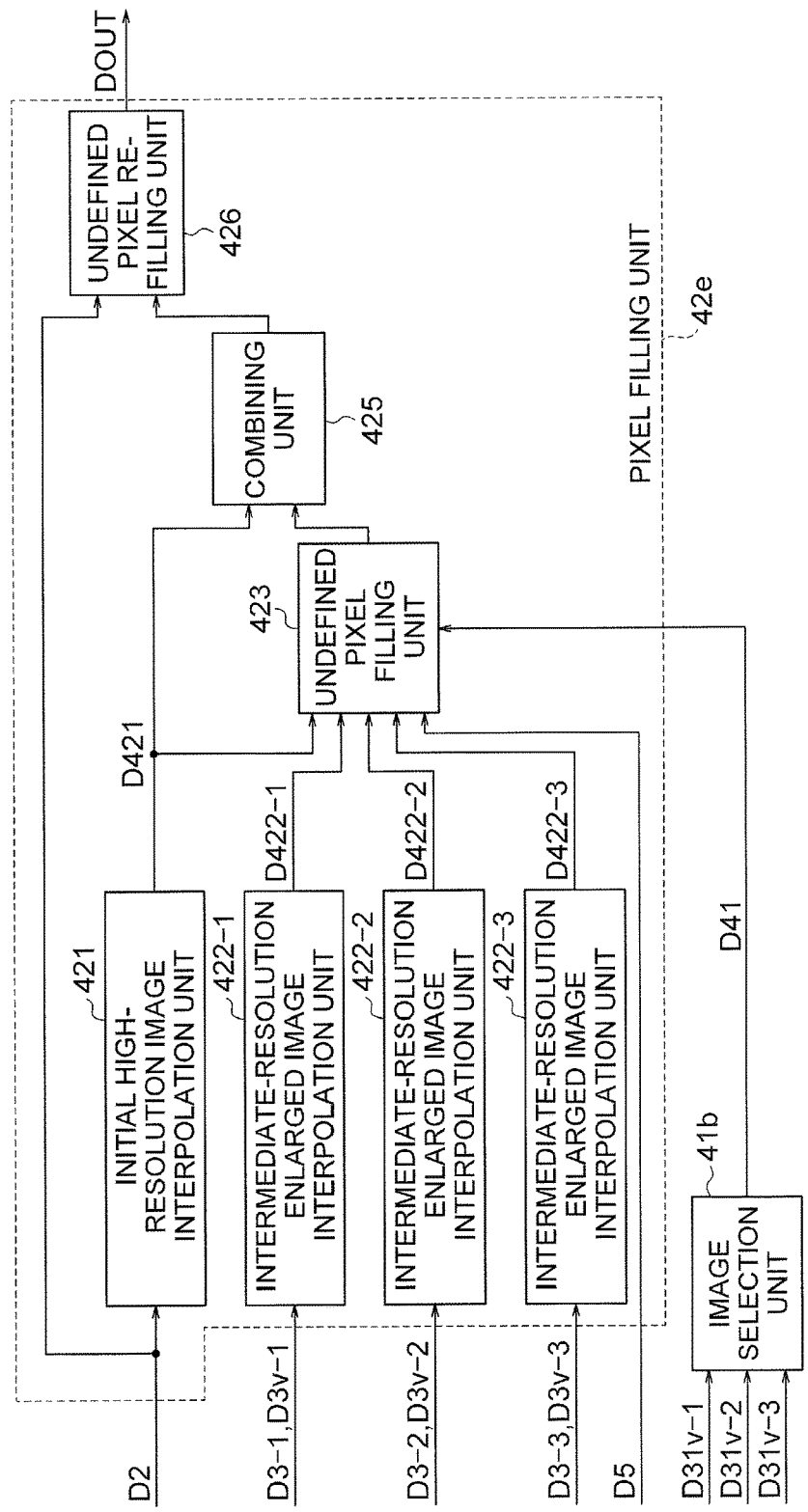
FIG. 18 is a block diagram showing another exemplary configuration of a high-resolution image filling unit in the fourth embodiment.

Incidentally, as shown in FIG. 18, the pixel value of the pixel interpolated by the initial high-resolution image interpolation unit 421 and the pixel value of the pixel filled by the undefined pixel filling unit 423 may be combined (blended) by a combining unit 425, and the resultant pixel value may be used for the filling in the initial high-resolution image D2, by an undefined pixel re-filling unit 426, and the resultant image may be used as the high-resolution image DOUT as a final output. A pixel filling unit having such a configuration is indicated by reference characters 42e.

Figure 19:
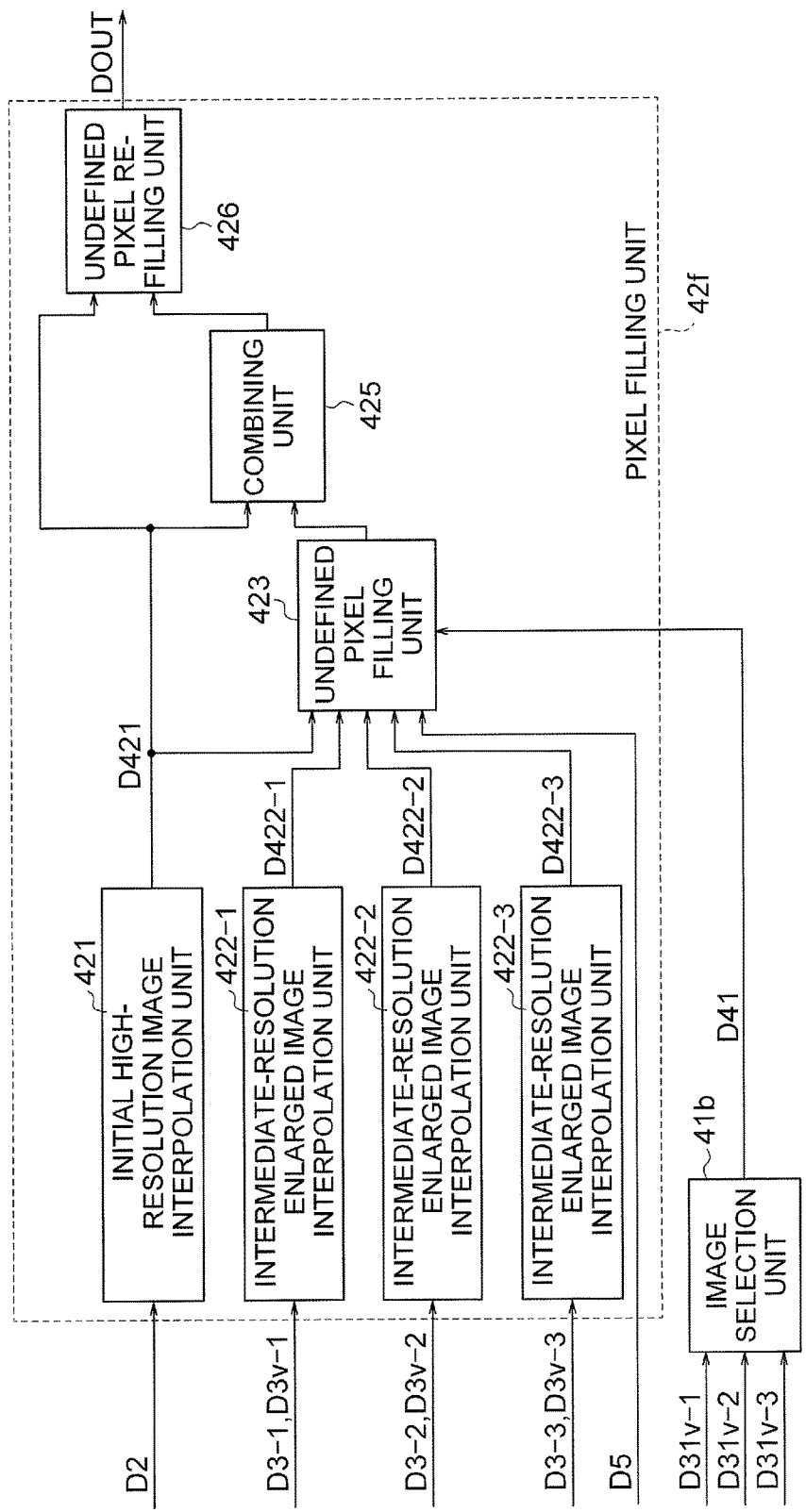
FIG. 19 is a block diagram showing a further exemplary configuration of a high-resolution image filling unit in the fourth embodiment.

Also, as shown in FIG. 19, the pixel value of the pixel interpolated by the initial high-resolution image interpolation unit 421 and the pixel value of the pixel filled by the undefined pixel filling unit 423 may be combined (blended) by the combining unit 425, and the resultant pixel value may be used for the filling in the initial high-resolution interpolated image D421 by an undefined pixel re-filling unit 427, and the resultant image may be used as the high-resolution image DOUT as a final output. An image filling unit having such a configuration is indicated by reference characters 42f.

The interpolation performed by the initial high-resolution image interpolation unit 421 using the valid pixels in the vicinity, or the interpolation performed by the intermediate-resolution enlarged image interpolation units 422-1 to 422-3 using the high-reliability pixels in the vicinity, may cause errors (noises) in areas containing many high-frequency components. By performing the combining (blending) by the combining unit 425 as shown in FIG. 18 or FIG. 19, the effects of noises can be reduced.

Figure 20:
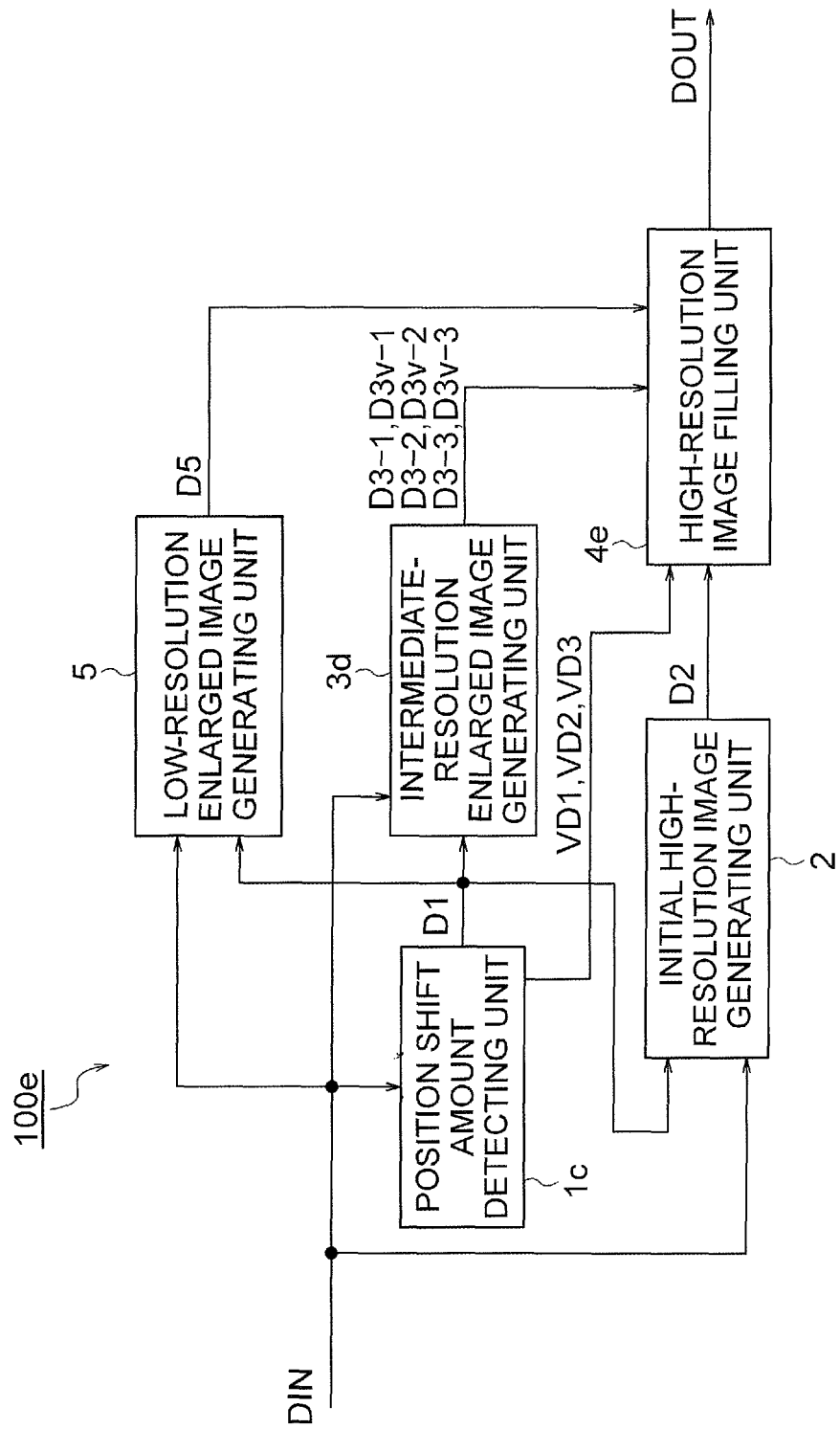
FIG. 20 is a block diagram showing another exemplary configuration of an image processing apparatus according to the fourth embodiment.

The description has been made with reference to FIG. 15, with regard to the configuration in which the intermediate-resolution enlarged image generating unit 3d shown in FIG. 16 is provided in place of the intermediate-resolution enlarged image generating unit 3b in the second embodiment, and the high-resolution image filling unit 4d shown in FIG. 17 is provided in place of the high-resolution image filling unit 4b in the second embodiment. However, as shown in FIG. 20, a configuration may be such that the intermediate-resolution enlarged image generating unit 3d shown in FIG. 16 is used in place of the intermediate-resolution enlarged image generating unit 3c in the third embodiment, and a high-resolution image filling unit 4e is provided in place of the high-resolution image filling unit 4c in the third embodiment. The high-resolution image filling unit 4e is similar to the high-resolution image filling unit 4d in FIG. 17, but differs in that the image selection unit 41b is replaced with the image selection unit 41c in FIG. 14. The image processing apparatus having such a configuration is indicated by reference characters 100e.

Furthermore, description has been made of variations in which the pixel filling unit 42e shown in FIG. 18 or the pixel filling unit 42f shown in FIG. 19 is used in place of the pixel filling unit 42d, with regard to the high-resolution image filling unit 4d shown in FIG. 17, used in the image processing apparatus in FIG. 15. However, similar variations may be applied to the high-resolution image filling unit 4e in the image processing apparatus shown in FIG. 20. That is, the pixel filling unit 42d in FIG. 14 may be replaced with the pixel filling unit 42e in FIG. 18 or the pixel filling unit 42f in FIG. 19.

In the embodiment described above, the intermediate-resolution enlarged image generating unit generates a plurality of intermediate-resolution enlarged images, and the high-resolution image filling unit 4d includes a plurality of intermediate-resolution enlarged image interpolation units. However, the intermediate-resolution enlarged image generating unit may be configured to generate just one intermediate-resolution enlarged image. In this case, the high-resolution image filling unit 4d may be of such a configuration in which only one intermediate-resolution enlarged image interpolation unit is provided. In such a case, either the intermediate-resolution enlarged image or the low-resolution enlarged image is selected. For example, in the configuration shown in FIG. 15, it is satisfactory if the intermediate-resolution enlarged image is selected if the valid pixel ratio pertaining to a single intermediate-resolution image is not smaller than the threshold value; otherwise the low-resolution enlarged image is selected. In the configuration shown in FIG. 20, it is satisfactory if the intermediate-resolution enlarged interpolated image is selected if the position shift degree pertaining to the single intermediate-resolution image is not larger than the threshold value; otherwise the low-resolution enlarged image is selected. Alternatively, the configuration may be such that the position shift degree pertaining to the single intermediate-resolution image and the position shift degree pertaining to the combined low-resolution image are compared with each other, the intermediate-resolution enlarged interpolated image is selected if the position shift degree pertaining to the intermediate-resolution image is smaller, and the low-resolution enlarged image is selected if the position shift degree pertaining to the combined low-resolution image is smaller.

According to the fourth embodiment, the initial high-resolution image interpolation unit 421 performs interpolation or filling, for each undefined pixel in the initial high-resolution image D2, based on the valid pixel ratio or the position shift degree relating to the proximate pixels. For instance, interpolation is performed for the areas where the valid pixel ratio is large, or the position shift degree is small. This enables determination of the pixel values of the undefined pixels based on the pixel values of the pixels in an image (initial high-resolution image) having a higher resolution.

Fifth Embodiment

Figure 21:
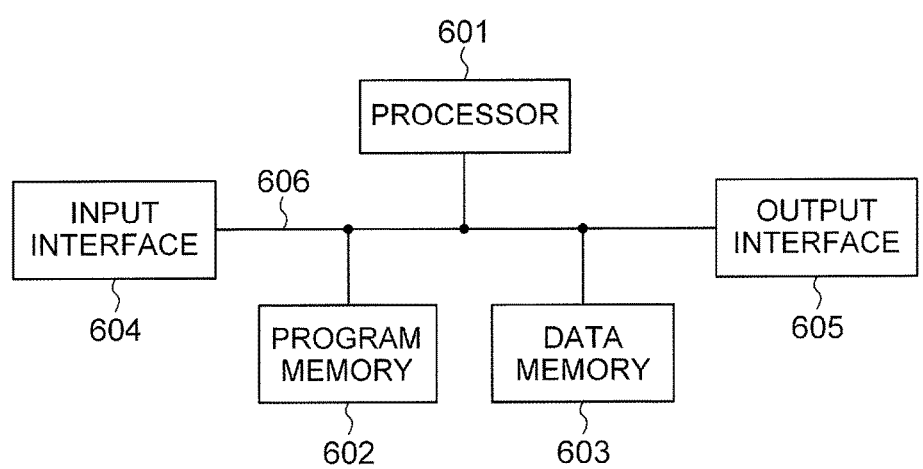
FIG. 21 is a block diagram showing an image processing apparatus according to a fifth embodiment of the present invention.

Part or the entirety of the image processing apparatus described in the first to fourth embodiments can be implemented by software, i.e., a programmed computer. FIG. 21 shows a computer used in such a case. The illustrated computer includes a processor 601, a program memory 602, a data memory 603, an input interface 604, an output interface 605, and a bus 606 interconnecting them.

The processor 601 operates on low-resolution images DIN input via the input interface 604, according to the program stored in the program memory 602. In the course of operation, various data are stored in the data memory 603. A high-resolution image DOUT generated as a result of the processing is output via the output interface 605.

Figure 22:
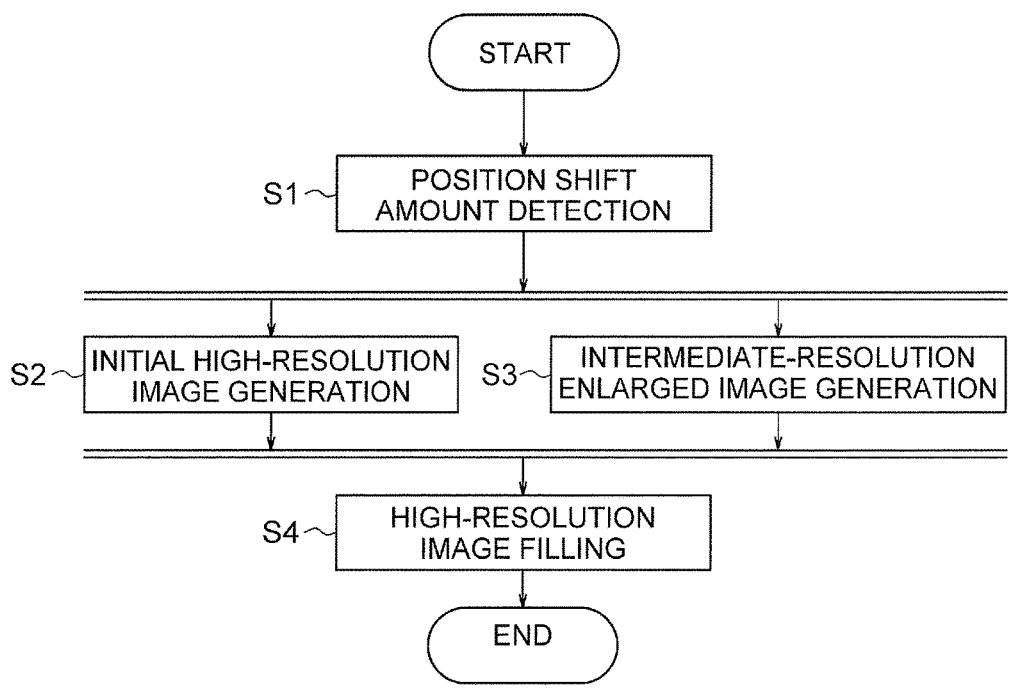
FIG. 22 is a flowchart showing a procedure in the image processing in the fifth embodiment.

Below, a procedure in which the computer shown in FIG. 21 performs the processes in the image processing apparatus in the first embodiment is explained with reference to FIG. 22 and FIG. 23.

First, in a position shift amount detecting step S1, position shift amount information D1 pertaining to the low-resolution images DIN is calculated. This process is identical to the process performed by the position shift amount detecting unit 1.

Next, in an initial high-resolution image generating step S2, an initial high-resolution image D2 is generated from the plurality of low-resolution images DIN, referring to the position shift amount information D1. This process is identical to the process performed by the initial high-resolution image generating unit 2.

Next, in an intermediate-resolution enlarged image generating step S3, an intermediate-resolution enlarged image D3 having an enlargement factor smaller than a target enlargement factor is generated, referring to the position shift amount information D1. This process is identical to the process performed by the intermediate-resolution enlarged image generating unit 3.

Figure 23:
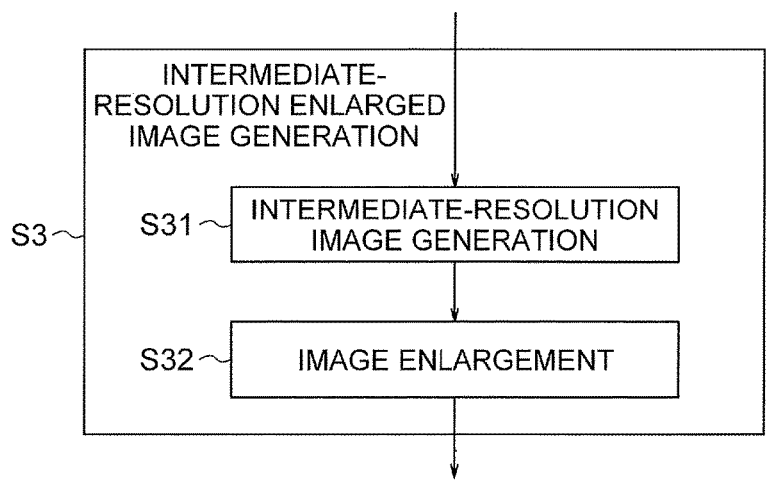
FIG. 23 is a flowchart showing details of an intermediate-resolution image enlargement process in FIG. 22.

FIG. 23 shows an example of a procedure of the processes in the intermediate-resolution enlarged image generating step S3. First, in an intermediate-resolution image generating step S31, an intermediate-resolution image D31 of an intermediate enlargement factor is generated. This process is identical to the process performed by the intermediate-resolution image generating unit 31.

Next, in an image enlarging step S32, the intermediate-resolution image D31 is enlarged to a size identical to that of the high-resolution image DOUT, and the resultant image is output as the intermediate-resolution enlarged image D3. In the enlargement, a filter computation process, such as a bilinear method or a bicubic method is used. This process is identical to the process performed by the image enlarging unit 32.

In a high-resolution image filling step S4, performed next after the step S3, undefined pixels in the initial high-resolution image D2 are filled, referring to the pixel value of the corresponding pixel in the intermediate-resolution enlarged image D3.

The high-resolution image DOUT which is obtained as a result of the filling, and in which the pixel values of all the undefined pixels have been estimated is output. This process is identical to the process performed by the high-resolution image filling unit 4.

The processes in the image processing apparatus in the second embodiment or the third embodiment can also be performed by a computer following a procedure similar to that described above. In such a case, in the intermediate-resolution image generating step S31 shown in FIG. 23, intermediate-resolution images having a plurality of mutually different intermediate enlargement factors are generated, and, in the image enlarging step S32, the intermediate-resolution images are enlarged after their undefined pixels are filled with an estimated value to generate the intermediate-resolution enlarged images D3-1 to D3-3 having the same size as the high-resolution image.

In the high-resolution image filling step S4, valid pixel ratios RDi or position shift degrees RQi are calculated, and one of the plurality of intermediate-resolution enlarged images and the low-resolution enlarged image is selected based on the calculated valid pixel ratios RDi or position shift degrees RQi, and used for the estimation of the pixel values in the initial high-resolution image.

The processes in the image process apparatus in the fourth embodiment can also be performed by a computer in a procedure similar to that described above. In such a case, in the intermediate-resolution image generating step S31 in FIG. 23, as in the case in which the second embodiment or the third embodiment is implemented by a computer, intermediate-resolution images having a plurality of mutually different intermediate enlargement factors are generated, and in the image enlarging step S32, the intermediate-resolution images are enlarged after their undefined pixels are filled with an estimated value, to generate the intermediate-resolution enlarged images D3-1 to D3-3 having the same size as the high-resolution image.

In the high-resolution image filling step S4, undefined pixels in the initial high-resolution image D2 are interpolated using the valid pixels in their vicinity to generate the initial high-resolution interpolated image D421, and low-reliability pixels in the intermediate-resolution enlarged images D3-1 to D3-3 are interpolated using the high-reliability pixels in their vicinity, to generate an intermediate-resolution enlarged interpolated images D422-1 to D422-3, and one of the plurality of intermediate-resolution enlarged interpolated images and the low-resolution enlarged image is selected based on valid pixel ratios RDi or position shift degrees RQi, and used for the estimation of the pixel values of the undefined pixels in the initial high-resolution interpolated image.

The variations described in connection with the first to fourth embodiments can also be applied to the fifth embodiment.

In the second and third embodiments, one of the one or more intermediate-resolution enlarged images and the low-resolution enlarged image that is optimum is selected, and the pixel value of the pixel in the selected enlarged image corresponding to the pixel of interest is used for the estimation of the pixel value of the pixel of interest. Alternatively, an average value of the pixels in the one or more intermediate-resolution enlarged images and the low-resolution enlarged image, corresponding to the pixel of interest may be used for the estimation of the pixel value of the pixel of interest. Also, in the fourth embodiment, an average value of pixels in the one or more intermediate-resolution enlarged interpolated image and the low-resolution enlarged image, corresponding to the pixel of interest, may be used for the estimation of the pixel value of the pixel of interest.

The present invention has been described as an image processing apparatus. An image processing method implemented by the above-described image processing apparatus also forms a part of the invention. Also, a program for having a computer to execute the functions of various parts of the above-described image processing apparatus or the various steps in the image processing method, and a computer-readable recording medium in which the program is recorded also form a part of the present invention.

As has been described, even when the number of the low-resolution images used is small, it is possible to generate a high-resolution image of a high picture quality with higher accuracy.

REFERENCE CHARACTERS

1: position shift amount detecting unit; 2: initial high-resolution image generating unit; 3, 3*b*, 3-1, 3-2, 3-3: intermediate-resolution enlarged image generating unit; 4, 4*b*, 4*c*, 4*d*, 4*e*, 4*f*: high-resolution image filling unit; 5: low-resolution enlarged image generating unit; 31, 31-1, 31-2, 31-3: intermediate-resolution image generating unit; 32, 32-1, 32-2, 32-3: image enlarging unit; 41*b*, 41*c*: image selection unit; 42, 42*d*, 42*e*, 42*f*: pixel filling unit; 51: combined low-resolution image generating unit; 52: image enlarging unit; 100, 100*b*, 100*c*: image processing apparatus; 411: valid pixel ratio calculation unit; 412: selection information generating unit; 413: position shift degree calculation unit; 414: selection information generating unit; 421: initial high-resolution image interpolation unit; 422-1, 422-2, 422-3: intermediate-resolution enlarged image interpolation unit; 423: undefined pixel filling unit; 425: combining unit; 426, 427: undefined pixel re-filling unit.

What is claimed is:

1. An image processing apparatus for generating a high-resolution image from a plurality of low-resolution images in which positions of pixels are mutually shifted, the high-resolution image having a resolution of a predetermined target enlargement factor with respect to the low-resolution images, comprising:

a position shift amount detecting unit for detecting a position shift amount pertaining to each of the pixels in the plurality of low-resolution images;

an initial high-resolution image generating unit for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;

an intermediate-resolution enlarged image generating unit for projecting, based on the position shift amounts, the pixels in the low-resolution images onto an image space having a resolution of an intermediate enlargement factor which is smaller than the target enlargement factor, associating the pixels in the low-resolution images with pixels in the image space, based on the projected positions, to generate an intermediate-resolution image including valid pixels which are pixels whose pixel values are defined, enlarging the intermediate-resolution image after estimating the pixel values of intermediate-resolution image undefined pixels which are included in the intermediate-resolution image and which are pixels whose pixel values are not defined, based on the pixel values of the valid pixels proximate to the intermediate-resolution image undefined pixels, thereby to generate an intermediate-resolution enlarged image of which a number of pixels is identical to that of the high-resolution image of the target enlarged factor and in which pixel values of all the pixels are defined; and a high-resolution image filling unit for estimating the pixel values of initial high-resolution image undefined pixels which are included in the initial high-resolution image and which are pixels whose pixel values are not defined, based on the pixel values of the pixels in the intermediate-resolution enlarged image, corresponding to the initial high-resolution image undefined pixels.

2. The image processing apparatus as set forth in claim 1, further comprising a low-resolution enlarged image generating unit for enlarging the low-resolution images to generate a low-resolution enlarged image, wherein said high-resolution image filling unit selects one of the intermediate-resolution enlarged image and the low-resolution enlarged image, and uses the selected image for the estimation of the pixel values of the initial high-resolution image undefined pixels.

3. An image processing apparatus for generating a high-resolution image from a plurality of low-resolution images in which positions of pixels are mutually shifted, the high-resolution image having a resolution of a predetermined target enlargement factor with respect to the low-resolution images, comprising:

a position shift amount detecting unit for detecting a position shift amount pertaining to each of the pixels in the plurality of low-resolution images;

an initial high-resolution image generating unit for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;

an intermediate-resolution enlarged image generating unit for projecting, based on the position shift amounts, the pixels in the low-resolution images onto image spaces having resolutions of first to Ith (I being an integer not smaller than 2) intermediate enlargement factors which are mutually different and which are smaller than the target enlargement factor, associating the pixels in the low-resolution images with pixels in the image spaces, based on the projected positions, to generate first to Ith intermediate-resolution images including valid pixels which are pixels whose pixel values are defined, enlarging the first to Ith intermediate-resolution images after estimating the pixel values of intermediate-resolution image undefined pixels which are included in the first to the Ith intermediate-resolution images and which are pixels whose pixel values are not defined, using the pixel values of the valid pixels proximate to the intermediate-resolution image undefined pixels, to generate first to Ith intermediate-resolution enlarged images of which a number of pixels is identical to that of the high-resolution image of the target enlarged factor and in which pixel values of all the pixels are defined;

a low-resolution enlarged image generating unit for enlarging the low-resolution images to generate a low-resolution enlarged image; and a high-resolution image filling unit for estimating the pixel values of initial high-resolution image undefined pixels which are included in the initial high-resolution image and which are pixels whose pixel values are not defined, based on the pixel values of the pixels in the first to Ith intermediate-resolution enlarged images and the low-resolution enlarged image, corresponding to the initial high-resolution image undefined pixels.

4. The image processing apparatus as set forth in claim 3, wherein said high-resolution image filling unit successively selects the initial high-resolution image undefined pixels as a pixel of interest, selects one of the first to Ith intermediate-resolution enlarged images and the low-resolution enlarged image, based on a ratio of the valid pixels in a region surrounding a position in each of the first to Ith intermediate-resolution images, corresponding to a position of the pixel of interest, and estimating the pixel value of the pixel of interest using the pixel value of the pixel in the selected image, corresponding to the pixel of interest.

5. The image processing apparatus as set forth in claim 4, wherein said high-resolution image filling unit selects, among the first to Ith intermediate-resolution images, the intermediate-resolution enlarged image generated from the intermediate-resolution image whose intermediate enlargement factor is the largest among the intermediate-resolution images of which the ratio of the valid pixels is not smaller than a predetermined valid pixel ratio threshold value.

6. The image processing apparatus as set forth in claim 5, wherein when the ratio of the valid pixels is smaller than the valid pixel ratio threshold value for all of the first to Ith intermediate-resolution images, said high-resolution image filling unit selects and uses the low-resolution enlarged image for the estimation of the pixel value of the pixel of interest.

7. The image processing apparatus as set forth in claim 3, wherein said high-resolution image filling unit successively selects the initial high-resolution image undefined pixels as a pixel of interest, selects one of the first to Ith intermediate-resolution enlarged images and the low-resolution enlarged image based on a degree of shifts in the projected positions, in a region surrounding a position in each of the first to Ith intermediate-resolution images, corresponding to a position of the pixel of interest, and estimates the pixel value of the pixel of interest using the pixel value of the pixel in the selected image, corresponding to the pixel of interest.

8. The image processing apparatus as set forth in claim 7, wherein said high-resolution image filling unit selects the intermediate-resolution enlarged image generated from the intermediate-resolution image of which the degree of the shifts in the projected positions is the smallest among the first to Ith intermediate-resolution images.

9. The image processing apparatus as set forth in claim 8, wherein when the degree of the shifts in the projected positions is larger than a predetermined position shift degree threshold value for all of the first to Ith intermediate-resolution images, said high-resolution image filling unit selects and uses the low-resolution enlarged image for the estimation of the pixel value of the pixel of interest.

10. The image processing apparatus as set forth in claim 3, wherein
said low-resolution enlarged image generating unit projects, based on the position shift amounts, the pixels in the low-resolution images onto an image space having the same resolution as the low-resolution images, associates the pixels in the low-resolution images with the pixels in the image space based on the projected positions, to generate a combined low-resolution image in which pixel values of all the pixels are defined, and enlarges the combined low-resolution image to generate the low-resolution enlarged image of which a number of pixels is identical to that of the high-resolution image of the target enlargement factor and in which pixel values of all the pixels are defined, and
said high-resolution image filling unit successively selects the initial high-resolution image undefined pixel as a pixel of interest, selects one of the first to Ith intermediate-resolution enlarged images and the low-resolution enlarged image, based on a degree of shifts in the projected positions, in a region surrounding a position in each of the first to Ith intermediate-resolution images and the combined low-resolution image, corresponding to a position of the pixel of interest, and estimates the pixel value of the pixel of interest using the pixel value of the pixel in the selected image, corresponding to the pixel of interest.

11. The image processing apparatus as set forth in claim 7, wherein
said high-resolution image filling unit calculates, as the degree of the shifts in the projected positions, an average of the shifts in the projected positions, with respect to those pixels which are in the surrounding region and with which the pixels from the low-resolution images are associated by the projection.

12. An image processing apparatus for generating a high-resolution image from a plurality of low-resolution images in which positions of pixels are mutually shifted, the high-resolution image having a resolution of a predetermined target enlargement factor with respect to the low-resolution images, comprising:
a position shift amount detecting unit for detecting a position shift amount pertaining to each of the pixels in the plurality of low-resolution images;
an initial high-resolution image generating unit for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;
an intermediate-resolution enlarged image generating unit for projecting, based on the position shift amounts, the pixels in the low-resolution images, onto image spaces having resolutions of first to Ith (I being an integer not smaller than 2) intermediate enlargement factors which are smaller than the target enlargement factor and which are mutually different, associating, based on the projected positions, the pixels in the low-resolution images with the pixels in the image spaces to generate first to Ith intermediate-resolution images including valid pixels which are pixels whose pixel values are defined, enlarging the first to Ith intermediate-resolution images, after estimating the pixel values of intermediate-resolution image undefined pixels which are pixels whose pixel values are not defined, using the pixel values of the valid pixels proximate to the intermediate-resolution image undefined pixels, to generate first to Ith intermediate-resolution enlarged images of which a number of pixels is identical to that of the high-resolution image of the target enlargement factor, and in which pixel values of all the pixels are defined, and outputting, for each pixel in each of the first to Ith intermediate-resolution enlarged images, reliability information indicating whether said each pixel is a high-reliability pixel which is at a position corresponding to a valid pixel in a corresponding intermediate-resolution image, or a low-reliability pixel which is at a position corresponding to an intermediate-resolution image undefined pixel in a corresponding intermediate-resolution image;
a low-resolution enlarged image generating unit for enlarging the low-resolution images to generate a low-resolution enlarged image;
an initial high-resolution image interpolation unit for performing interpolation, for each of initial high-resolution image undefined pixels which are included in the initial high-resolution image and which are pixels whose pixel values are not defined, referring to the valid pixels in a vicinity of the initial high-resolution image undefined pixels, if a ratio of the valid pixels among the pixels proximate to said each of the initial high-resolution image undefined pixels is not smaller than a predetermined valid pixel ratio threshold value, to output an initial high-resolution interpolated image;
intermediate-resolution enlarged image interpolation units for performing interpolation, for each of the low-reliability pixels in each of the first to Ith intermediate-resolution enlarged images, referring to the high-reliability pixels in a vicinity of said each of the low-reliability pixels, if a ratio of the high-reliability pixels among the pixels proximate to said each of the low-reliability pixels is not smaller than a predetermined high-reliability pixel ratio threshold value, to output first to Ith intermediate-resolution enlarged interpolated images; and
an undefined pixel filling unit for successively selecting, as a pixel of interest, initial high-resolution interpolated image undefined pixels which are included in the initial high-resolution interpolated image and which are pixels whose pixel values are not defined, and estimating the pixel value of the pixel of interest, based on pixel values of pixels in the first to Ith intermediate-resolution enlarged interpolated images and the low-resolution enlarged image, corresponding to the pixel of interest.

13. The image processing apparatus as set forth in claim 12, further comprising
an image selection unit for selecting one of the first to Ith intermediate-resolution enlarged interpolated images and the low-resolution enlarged image, based on a ratio of the valid pixels in a region surrounding a position in each of the first to Ith intermediate-resolution images, corresponding to a position of the pixel of interest, wherein
said undefined pixel filling unit estimates the pixel value of the pixel of interest using the pixel value of the pixel in the image selected by the image selection unit, corresponding to the pixel of interest.

14. The image processing apparatus as set forth in claim 12, further comprising
an image selection unit for selecting one of the first to Ith intermediate-resolution enlarged interpolated images and the low-resolution enlarged image, based on a degree of shifts in the projected positions in a region surrounding a position in each of the first to Ith intermediate-resolution images, corresponding to a position of the pixel of interest, wherein
said undefined pixel filling unit estimates the pixel value of the pixel of interest using the pixel value of the pixel in the image selected by said image selection unit, corresponding to the pixel of interest.

15. The image processing apparatus as set forth in claim 12, further comprising:
a combining unit for combining the image obtained as a result of the estimation of the pixel values by said undefined pixel filling unit, and the initial high-resolution interpolated image; and
an undefined pixel re-filling unit for estimating the pixel values of the initial high-resolution image undefined pixels using the image obtained as a result of the combination by said combining unit.

16. The image processing apparatus as set forth in claim 12, further comprising:
a combining unit for combining the image obtained as a result of estimation by said undefined pixel filling unit and the initial high-resolution interpolated image; and
an undefined pixel re-filling unit for estimating the pixel values of the initial high-resolution interpolated image undefined pixels using the image obtained as a result of the combination by said combining unit.

17. An image processing method for generating a high-resolution image from a plurality of low-resolution images in which positions of pixels are mutually shifted, the high-resolution image having a resolution of a predetermined target enlargement factor with respect to the low-resolution images, comprising:
a position shift amount detecting step for detecting a position shift amount pertaining to each of the pixels in the plurality of low-resolution images;
an initial high-resolution image generating step for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;
an intermediate-resolution enlarged image generating step for projecting, based on the position shift amounts, the pixels in the low-resolution images onto an image space having a resolution of an intermediate enlargement factor which is smaller than the target enlargement factor, associating the pixels in the low-resolution images with pixels in the image space, based on the projected positions, to generate an intermediate-resolution image including valid pixels which are pixels whose pixel values are defined, enlarging the intermediate-resolution image after estimating the pixel values of intermediate-resolution image undefined pixels which are included in the intermediate-resolution image and which are pixels whose pixel values are not defined, based on the pixel values of the valid pixels proximate to the intermediate-resolution image undefined pixels, thereby to generate an intermediate-resolution enlarged image of which a number of pixels is identical to that of the high-resolution image of the target enlarged factor and in which pixel values of all the pixels are defined; and
a high-resolution image filling step for estimating the pixel values of initial high-resolution image undefined pixels which are included in the initial high-resolution image and which are pixels whose pixel values are not defined, based on the pixel values of the pixels in the intermediate-resolution enlarged image, corresponding to the initial high-resolution image undefined pixels.

18. An image processing method for generating a high-resolution image from a plurality of low-resolution images in which positions of pixels are mutually shifted, the high-resolution image having a resolution of a predetermined target enlargement factor with respect to the low-resolution images, comprising:
a position shift amount detecting step for detecting a position shift amount pertaining to each of the pixels in the plurality of low-resolution images;
an initial high-resolution image generating step for projecting, based on the detected position shift amounts, the pixels in the low-resolution images onto an image space having a resolution of said target enlargement factor, and associating the pixels in the low-resolution images with pixels in the image space, based on the projected positions, to generate an initial high-resolution image including valid pixels which are pixels whose pixel values are defined;
an intermediate-resolution enlarged image generating step for projecting, based on the position shift amounts, the pixels in the low-resolution images onto image spaces having resolutions of first to Ith (I being an integer not smaller than 2) intermediate enlargement factors which are mutually different and which are smaller than the target enlargement factor, associating the pixels in the low-resolution images with pixels in the image spaces, based on the projected positions, to generate first to Ith intermediate-resolution images including valid pixels which are pixels whose pixel values are defined, enlarging the first to Ith intermediate-resolution images after estimating the pixel values of intermediate-resolution image undefined pixels which are included in the first to the Ith intermediate-resolution images and which are pixels whose pixel values are not defined, using the pixel values of the valid pixels proximate to the intermediate-resolution image undefined pixels, to generate first to Ith intermediate-resolution enlarged images of which a number of pixels is identical to that of the high-resolution image of the target enlarged factor and in which pixel values of all the pixels are defined;
a low-resolution enlarged image generating step for enlarging the low-resolution images to generate a low-resolution enlarged image; and
a high-resolution image filling step for estimating the pixel values of initial high-resolution image undefined pixels which are included in the initial high-resolution image and which are pixels whose pixel values are not defined, based on the pixel values of the pixels in the first to Ith intermediate-resolution enlarged images and the low-resolution enlarged image, corresponding to the initial high-resolution image undefined pixels.

19. A non-transitory computer-readable recording medium storing a program for causing a computer to execute the processes in the steps in the image processing method as set forth in claim 17.

\* \* \* \* \*